United States Patent
Mazzola et al.

(10) Patent No.: US 7,499,290 B1
(45) Date of Patent: Mar. 3, 2009

(54) POWER CONVERSION

(75) Inventors: Michael S. Mazzola, Starkville, MS (US); James R. Gafford, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 148 days.

(21) Appl. No.: 11/132,205

(22) Filed: May 19, 2005

Related U.S. Application Data

(60) Provisional application No. 60/572,234, filed on May 19, 2004.

(51) Int. Cl.
H02M 3/335 (2006.01)

(52) U.S. Cl. ........................................ 363/17
(58) Field of Classification Search ................. 363/17, 363/56.02, 58, 127, 89, 141
See application file for complete search history.

(56) References Cited

U.S. PATENT DOCUMENTS

| | | | |
|---|---|---|---|
| 4,466,070 A | 8/1984 | Claussen | |
| 4,862,342 A | 8/1989 | Dhyanchand et al. | |
| 4,942,511 A | 7/1990 | Lipo et al. | |
| 5,010,471 A | 4/1991 | Klaassens et al. | |
| 5,270,914 A | 12/1993 | Lauw et al. | |
| 5,497,289 A * | 3/1996 | Sugishima et al. | 361/709 |
| 5,625,539 A * | 4/1997 | Nakata et al. | 363/17 |
| 5,774,351 A | 6/1998 | Hsieh et al. | |
| 5,889,668 A | 3/1999 | Schauder et al. | |
| 6,020,688 A | 2/2000 | Moisin | |
| 6,229,718 B1 | 5/2001 | Nilssen | |
| 6,404,655 B1 * | 6/2002 | Welches | 363/41 |
| 6,483,731 B1 | 11/2002 | Isurin et al. | |
| 6,519,168 B2 | 2/2003 | Jain et al. | |
| 6,700,803 B2 | 3/2004 | Krein | |
| 6,711,533 B1 * | 3/2004 | Aymard et al. | 703/13 |
| 6,839,249 B2 | 1/2005 | Kalman et al. | |
| 7,054,167 B2 * | 5/2006 | Yasumura | 363/16 |
| 2006/0126364 A1 * | 6/2006 | Yasumura | 363/16 |

OTHER PUBLICATIONS

Isurin, A., et al., "A Novel Resonant Converter Topology and its Application", IEEE, 1039-1044 (2001).

Mohan, N., et al., "Switch-Mode dc-ac, Inverters: dc ↔ Sinusoidal ac", Power Electronics, Converters, Applications, and Design, 2nd Ed., 8, 200-243 (1995).

(Continued)

*Primary Examiner*—Shawn Riley
(74) *Attorney, Agent, or Firm*—Butler, Snow, O'Mara, Stevens & Cannada PLLC

(57) ABSTRACT

Components, systems and methods for generating variable frequency AC voltage from a DC power supply are described. The components include a full-bridge (FB) parallel load resonant (PLR) converter which operates in discontinuous conduction mode. The PLR converter includes MOSFETs in an H-bridge configuration and employs a topology which minimizes inductance. The PLR converter can be coupled to a single or poly-phase bridge for use as an inverter. The inverter can be used to produce an AC sinusoidal waveform from a low voltage, high current DC power supply. Systems and techniques for modulating the output from the PLR converter to produce an AC sinusoidal waveform having desired characteristics, including frequency and voltage, are also provided. The PLR converter can also be coupled to a rectifier for use as a DC-DC converter.

20 Claims, 27 Drawing Sheets

OTHER PUBLICATIONS

Mohan, N., et al., "Resonant-dc-Link Inverters With Zero-Voltage Switchings", Power Electronics, Converters, Applications, and Design, 2nd Ed., Sec. 9-7, 287-289 (1995).

Inagaki, K., et al., "High Frequency Link DC/AC Converters Using Three Phase Output PWM Cycloconverters for Uninterruptible Power Supplies", Intelec'91, 580-586 (1991).

Krein, P., et al., "High-Frequency Link Inverter Based on Multiple-Carrier PWM", Proc. IEEE Applied Electronics Conf., 997-1003 (2002).

Krein, P., et al., "Low Cost Inverter Suitable for Medium-Power Fuel Cell Sources", Proc. IEEE Power Electronics Specialist Conf., 321-326 (2002).

Sood, P., et al., "Power Conversion Distribution System Using a High-Frequency AC Link", IEEE Transactions on Industry Applications, vol. 24, 2, 288-300 (1988).

Sood, P., et al., "A Versatile Power Converter for High-Frequency Link Systems", IEEE Transactions on Power Electronics, vol. 3, 4, 383-390 (1988).

Sul, S., et al., "Design and Performance of a High Frequency Link Induction Motor Drive Operating at Unity Power Factor", IEEE Transactions on Industry Applications, vol. 26, 3, 434-440 (1990).

Steigerwald, R., "Power Electronic Converter Technology", Proceedings of the IEEE, vol. 89, 6, 890-897 (2001).

Viejo, C., et al., "A Resonant High Voltage Converter With C-Type Output Filter", IEEE, 2401-2407 (1995).

Bhat, A., et al., "A Unified Approach for the Steady-State Analysis of Resonant Converters", IEEE Transactions on Industrial Electronics, vol. 38, 4, 251-259 (1991).

Steigerwald, R., "A Comparison of Half-Bridge Resonant Converter Topologies", IEEE Transactions on Power Electronics, vol. 3, 2, 174-182 (1988).

Steigerwald, R., "High Frequency Resonant Transistor DC-DC Converters", IEEE Transactions on Industrial Electronics, vol. IE-31, 2, 188-190 (1984).

Ojo, O., et al., "Time-Averaging Equivalent Circuit Analysis and Controller Design of Full-Bridge Parallel Resonant DC/DC Converters", Conference Record of the IEEE Industry Applications Society Annual Meeting, vol. 1, 977-989 (1991).

Kang, Y-G., et al., "Analysis and Design of a Half-Bridge Parallel Resonant Converter", IEEE Transactions on Power Electronics, vol. 3, 3, 254-265 (1988).

Mohan, N., et al., Power Electronics Converters, Applications, and Design, 2nd Ed., "Switch-Mode dc-ac, Inverters: dc ↔, Sinusoid ac", Ch. 8-4 Three-Phase Inverters, 225-239.

Mohan, N., et al., Power Electronics—Converters, Applications, and Design, 2nd Ed., J. Wiley & Sons, Inc., New York, Ch. 9, pp. 254-256 (1995).

\* cited by examiner (b)

(a)

(a)

(b)

Sine Function Model of Resonant Capacitor Voltage

Impulse Function Model of Resonant Capacitor Voltage

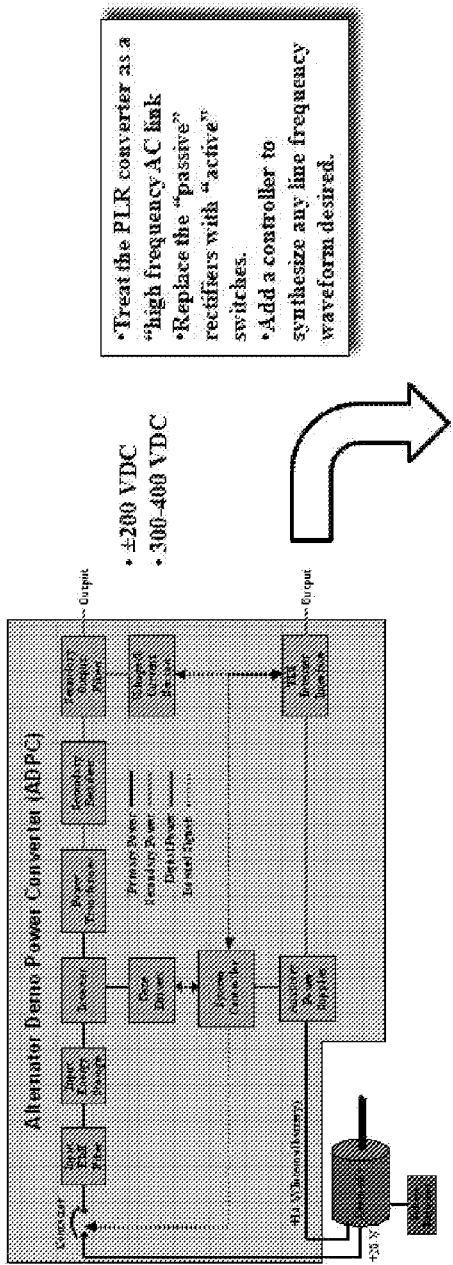
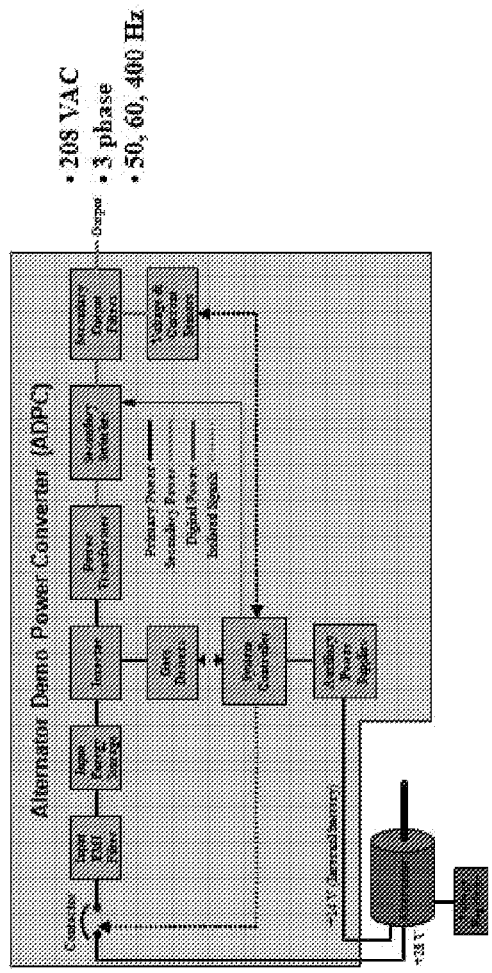
FIG. 23A
FIG. 23B

POWER CONVERSION

This application claims the benefit of Provisional U.S. patent application Ser. No. 60/572,234, filed May 19, 2004, the entirety of which is incorporated herein by reference.

This invention was made with United States Government support under Contract No. DASG60-00-C-0074, awarded by the United States Army Space and Missile Defense Command. The United States Government has certain rights in this invention.

BACKGROUND

1. Technical Field

The present application relates generally to power conversion and, in particular, to components, systems and methods for converting DC voltage and for generating variable frequency AC voltage from a DC voltage source.

2. Background of the Technology

According to one embodiment, a full-bridge (FB) parallel load resonant (PLR) converter is provided which operates in discontinuous conduction mode (DCM). References to parallel load resonant (PLR) converters can be found in the literature. The basic principle associated with the operation of PLR converter is to utilize the natural resonance of an L-C circuit for energy conversion. Current flowing through the device can be controlled using transistors arranged in various known topologies to regulate the cycles of a resonant waveform. The sinusoidal nature of a resonant waveform has the distinct advantage of allowing for zero current and/or zero voltage switching, which greatly reduces switching losses when compared to traditional pulse width modulation (PWM) techniques. Because "pulse width" is determined by the resonant frequency, voltage regulation is attained via frequency modulation.

Examples of PLR circuits are disclosed in U.S. Pat. Nos. 6,229,718 and 6,020,688, which patents are incorporated herein by reference. These circuits are used mostly in low power applications such as inverters for fluorescent lamp ballast. High efficiency, low voltage, wide load variation resonant converters have also been disclosed [1]. See also U.S. Pat. No. 6,483,731, which is incorporated herein by reference in its entirety. These resonant converters employ a multi-voltage resonant secondary to boost the output voltage.

According to further embodiments, also provided is a power inversion system and modulation techniques for use therewith wherein the system comprises a six-pulse inverter and a full-bridge (FB) parallel load resonant (PLR) converter operating in discontinuous conduction mode (DCM). DC-AC inverters are disclosed in U.S. Pat. Nos. 4,466,070; 4,862,342; 5,774,351; 5,889,668; and 6,519,168. AC-AC converters are disclosed in U.S. Pat. Nos. 4,942,511; 5,010,471; 5,270,914; and 6,839,249. In addition, switch-mode DC-AC inverters with a DC link are disclosed in references [2] and [3] and switch-mode DC-AC inverters with a high-frequency AC link and pulse width modulated (PWM) cycloconverters are disclosed in references [4-6] as well as in U.S. Pat. No. 6,700,803. Cycloconverters are systems that directly convert a higher frequency ac voltage to a lower frequency ac voltage. The inverters disclosed in these references generally involve square-wave bipolar or unipolar pulses with durations that are continuously variable. An objective of the methods disclosed in these references " . . . [to] produce exactly the same waveforms as conventional PWM, while supporting HF links" [5]. Also, switch-mode DC-AC inverters with a high-frequency AC link and pulse width modulated (PWM) cycloconverters are disclosed in references [7-9]. The inverters described in these references invariably involve the rectification and impulse excitation of a low-pass filter with integral half-cycle sinusoidal, or quasi sinusoidal, voltages originating from a source of high-frequency AC voltage (meaning a waveform with zero average value which is transformable by a high-frequency transformer).

There still exists a need for improved power converters, particularly for conversion of low voltage DC power sources.

SUMMARY

According to a first embodiment, a circuit is provided which comprises:
a primary section adapted to receive a DC input;
a secondary section comprising a parallel capacitance resonance section and a rectifying section; and
a transformer coupling the primary and secondary sections;
wherein the primary section comprises a plurality of MOSFETs in an H-bridge configuration comprising a first group of MOSFETs on a first side of the bridge and a second group of MOSFETs on a second side of the bridge opposite the first side of the bridge;
wherein the input voltage is applied to the drain terminals of the first group of MOSFETs;
wherein the source terminals of the first group of MOSFETs, the drain terminals of the second group of MOSFETs and the primary side of the transformer are connected;
wherein the source terminals of the second group of MOSFETs are connected to form a return path for the current; and
wherein a parallel capacitance section is connected across the input.

According to a second embodiment, a converter is provided which comprises:
a circuit as set forth above further comprising a rectifying section connected to the transformer secondary, wherein the rectifying section comprises bidirectional switches in a single-phase or poly-phase bridge; and
a central controller which is adapted to control the bi-directional switches in the rectifying section.

According to a third embodiment, a power conversion method is provided which comprises:
generating a stream of alternating polarity pulses with a parallel-loaded resonant (PLR) inverter operating in discontinuous conduction mode;
rectifying the pulses using a single-phase or a poly-phase inverter bridge;
filtering the rectified pulses with a single phase or a poly phase low pass filter; and generating a single-phase or poly-phase alternating current (AC) having a sinusoidal waveform;
wherein the alternating current having a sinusoidal waveform has a lower-frequency than the stream of alternating polarity pulses.

According to a fourth embodiment, a DC-AC converter is provided which comprises a parallel-loaded resonant (PLR) inverter;
gate drivers associated with the PLR inverter;
a three-phase six-pulse bridge with bidirectional switches comprising power MOSFETs or power IGBTs;
gate drivers associated with the inverter bridge; and
a central controller comprising an FPGA, electronic memory, and associated analog and digital sensors and controls.

BRIEF DESCRIPTION OF THE DRAWINGS

FIGS. 19A-19C illustrates the implementation of the SWCM algorithm wherein FIG. 19A shows the state vectors which describe all possible unit cells, FIG. 19B shows intersection of the carrier and reference in the fourth interval and FIG. 19C shows intersection of the carrier and reference in the second interval.

FIGS. 23A and 23B are schematics illustrating two alternative system embodiments wherein FIG. 23A shows a DC-DC converter system and FIG. 23B shows a DC-AC inverter system.

DETAILED DESCRIPTION

Figure 1:
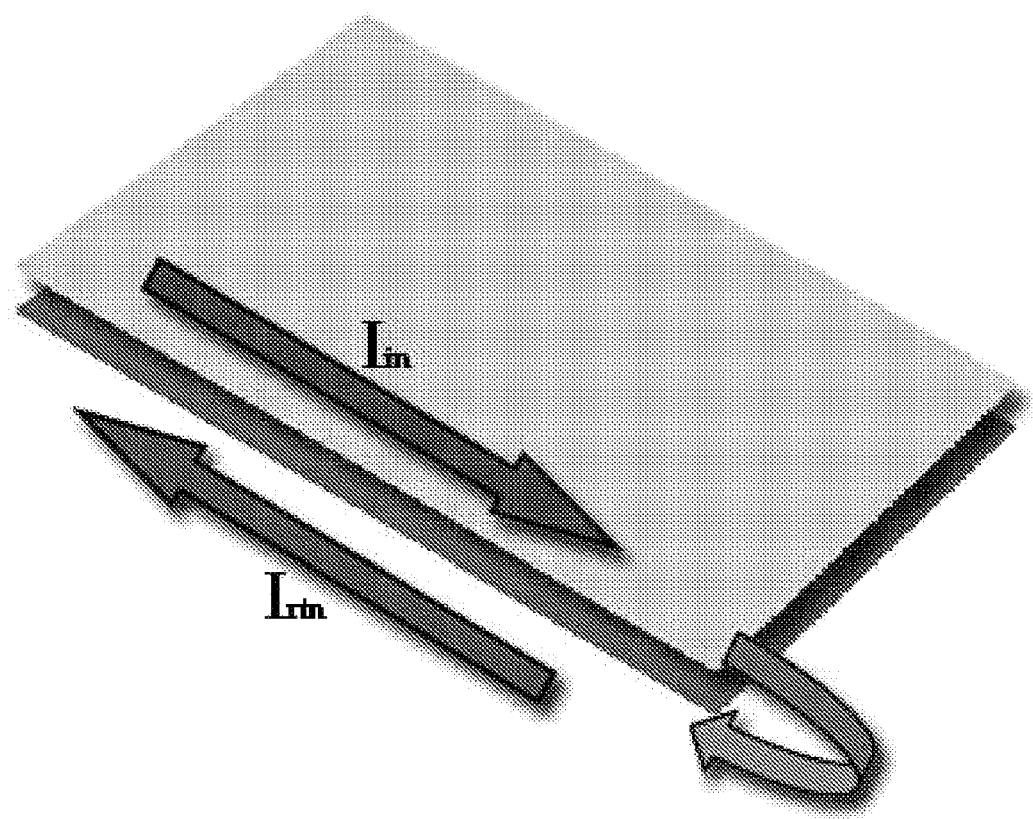
FIG. 1 illustrates a primary layout for a full-bridge PLR converter.

According to one embodiment, the technology disclosed in this application relates to electrical energy conversion techniques for direct current (DC) voltage transformation where input power is low voltage and high current and wherein the output is high voltage. According to a further embodiment, the technology is related to high frequency (HF) alternating current (AC) signal generation. This technology has applicability for kilowatt class, high power density DC boost converters and as a high frequency AC source for HF link inverters. In particular, this technology has applicability for voltage conversion in vehicles where electrical power is generated by a low voltage alternator (typically 12 V or 28 V) as well as in the emerging 42 V technologies. However, this technology can also be used in any other applications where energy conversion is required for a low voltage, high power source.

According to one embodiment, the technology described herein is based on the concept of a full-bridge (FB) parallel load resonant (PLR) converter operating in discontinuous conduction mode (DCM). The technology makes use of the natural resonance associated with transformer leakage inductance and a capacitance in parallel with the output on the secondary side of the transformer. Proper utilization of this resonance produces very efficient energy conversion by reducing stress on the switching components.

Some basic principles of load resonant converter design are discussed below. The maximum load that a PLR converter can drive is determined by the natural impedance of the resonant circuit. This is calculated as follows:

$$Z_0 = \sqrt{\frac{L_r}{C_r}}$$

where $L_r$ is the resonant inductance and in this case transformer leakage inductance and $C_r$ is the resonant capacitance. The lower the ratio between the inductance and the capacitance the higher power that can be delivered to the load by the PLR converter [10].

In order to achieve high power density, high resonant frequencies are desired to reduce the size of passive components. Resonant frequency is determined by the following equation [10]:

$$\omega_0 = \frac{1}{\sqrt{L_r C_r}}.$$

Another distinct advantage inherent to the design of a full-bridge PLR converter is the ability to incorporate several of the circuits non-idealities into the basic components of the device, namely the leakage inductance and intrawinding capacitance of the transformer [11-15]. These two parasitic elements are easily incorporated into a PLR boost converters resonant inductance and capacitance respectively.

According to one embodiment, as an effort to attain a minimal value for $L_r$, the leakage inductance comprises the total value of the resonant inductor. This has the added effect of reducing the number of components as well as simplifying the layout. This aspect of the design also maximizes $Z_o$ and $\omega_o$.

It has long been known that a current carrying conductor produces a magnetic field. Inductance is the measure of energy stored in such a magnetic field. The energy stored in a magnetic field can be defined as:

$$E = 1/2 LI^2$$

It is also known that for current flowing in an enclosed path of two parallel plates separated by air $$L = \frac{\mu_0 A}{d}$$

where $\mu_o$ is the permeability of free space, d is the width of the plates, and A is the cross-sectional area enclosed by the current path. This is to say that inductance of current flowing between two plates is dependent on the area enclosed by the current loop. Because of inductance current flowing through a conductor cannot change instantaneously. For a given potential (V) and inductance, the rate of change of current is defined as:

$$V = L \, di/dt.$$

Given the preceding expressions, in order to design a converter capable of transforming high power at high frequency, inductance must be kept as low as possible. Achieving minimal inductance is all the more important for low input voltage systems. There is some discussion of minimizing inductance for high frequency converters found in the available literature. See, for example, U.S. Pat. Nos. 6,563,377 and 6,307,757, each of which is incorporated herein by reference in its entirety.

According to one embodiment, the present invention is directed to a full-bridge parallel load resonant (PLR) converter operating in discontinuous conduction mode. One of the advantages of this design in this particular mode of operation is the linear relationship between the converter output and the switching frequency [16]. In short, the control of this type of resonant converter is load independent. A detailed analysis of a full-bridge PLR converter in DCM can be found in the available literature [17].

According to one embodiment, a low input voltage, high power, high power density DC-DC boost converter is provided in a full bridge PLR topology by means of a lower inductance layout than could be previously achieved. According to a further embodiment, a high frequency AC voltage source is also provided which can be used in HF link inverters wherein the same low inductance layout can be achieved.

The total loop parasitic inductance of the converter can be utilized by making it one of the resonant components of the PLR topology. Utilizing the parasitic inductance inherent to the selected topology allows the size of the device to be reduced and losses associated with these non-idealities are abated.

As mentioned previously, inductance is dependent on the cross sectional area of the current path in any closed circuit. The present inventors sought to maximize power density for this converter through high frequency resonant operation. It has already been stated that the resonant frequency is the inverse of the square root of the product of the resonant capacitance and inductance and the natural impedance of the PLR converter is equal to $(L_r/C_r)^{1/2}$. Therefore, high power and high frequency in this type of converter can be achieved by minimizing the parasitic inductance. This can be achieved by minimizing the cross-sectional area of the current path on the primary side of the converter.

Although low input voltage can be a major drawback in that it limits di/dt and it requires conduction of high current to meet high power demands, the use of low input voltage does have the advantage of allowing for close tolerances between components without the worry of dielectric breakdown. These reasons allowed for a rather unique arrangement of the topology. Moreover, to conduct the sizeable currents (>250 A DC), substantial copper bus work was used. Furthermore, in order to switch these currents at high frequency, paralleling of multiple metal oxide field effect transistors (MOSFETs) was also employed. In addition, a sizeable heatsink was used to exhaust the heat generated by the switching and the $I^2R$ losses.

According to one embodiment, these problems were addressed by using wide planar busses to conduct current to the MOSFETs which were mounted to one common heatsink. The selection of the extruded aluminum heatsink was given to a design with a flat open top plate. In this embodiment, the heatsink itself can be used as the return path for the high frequency electrical current connection to the input energy storage capacitors. In addition, MOSFETs having an isolated base could be mounted directly on the top of the heat sink. A planar copper bus could also be placed on top of the heatsink with a thin insulating material separating the bus from the heat sink. This arrangement allowed electrical current to flow in what could be approximated as two closely spaced conductive planes with the same current flowing in opposite directions. A simplified diagram of this layout can be seen in FIG. 1 in which the return current is illustrated flowing back to the energy storage capacitors through the heatsink. This layout minimizes loop inductance by approximating the so-called "strip line" configuration of current conductors.

Figure 2:
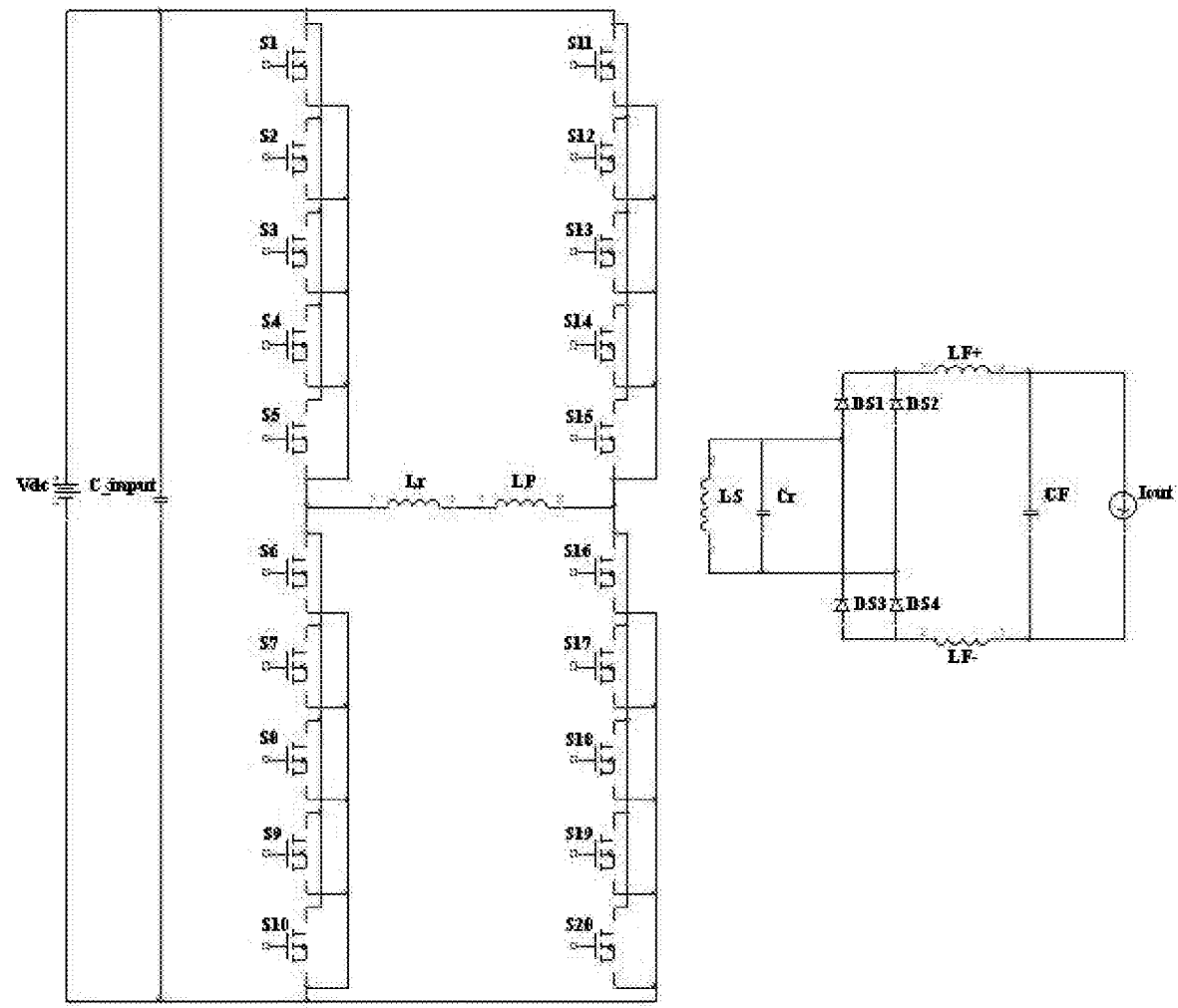
FIG. 2 illustrates a simplified full bridge schematic.

As set forth above, the topology of the PLR converter is in the family of converters referred to as full-bridge or H-bridge. FIG. 2 is a simplified schematic of the H-bridge configuration used for this design. As shown in FIG. 2, in total, 20 MOSFETs were used to switch the high frequency resonant current. In FIG. 2, there are 10 switches in each of the two legs of the converter.

In FIG. 2, FETs 1-5 and 16-20 comprise one leg and FETs 6-15 make up the other leg.

As illustrated in the layout shown in FIGS. 3, 4, 5, and 6, preferred embodiments of the converter use machined copper busses to make most of the interconnections on the primary and secondary of the converter. On the primary side of the transformer, the DC input voltage is applied to the drain-terminals on the high side of the two legs of the full bridge topology (FETs 1-5 and 11-15).

Figure 3:
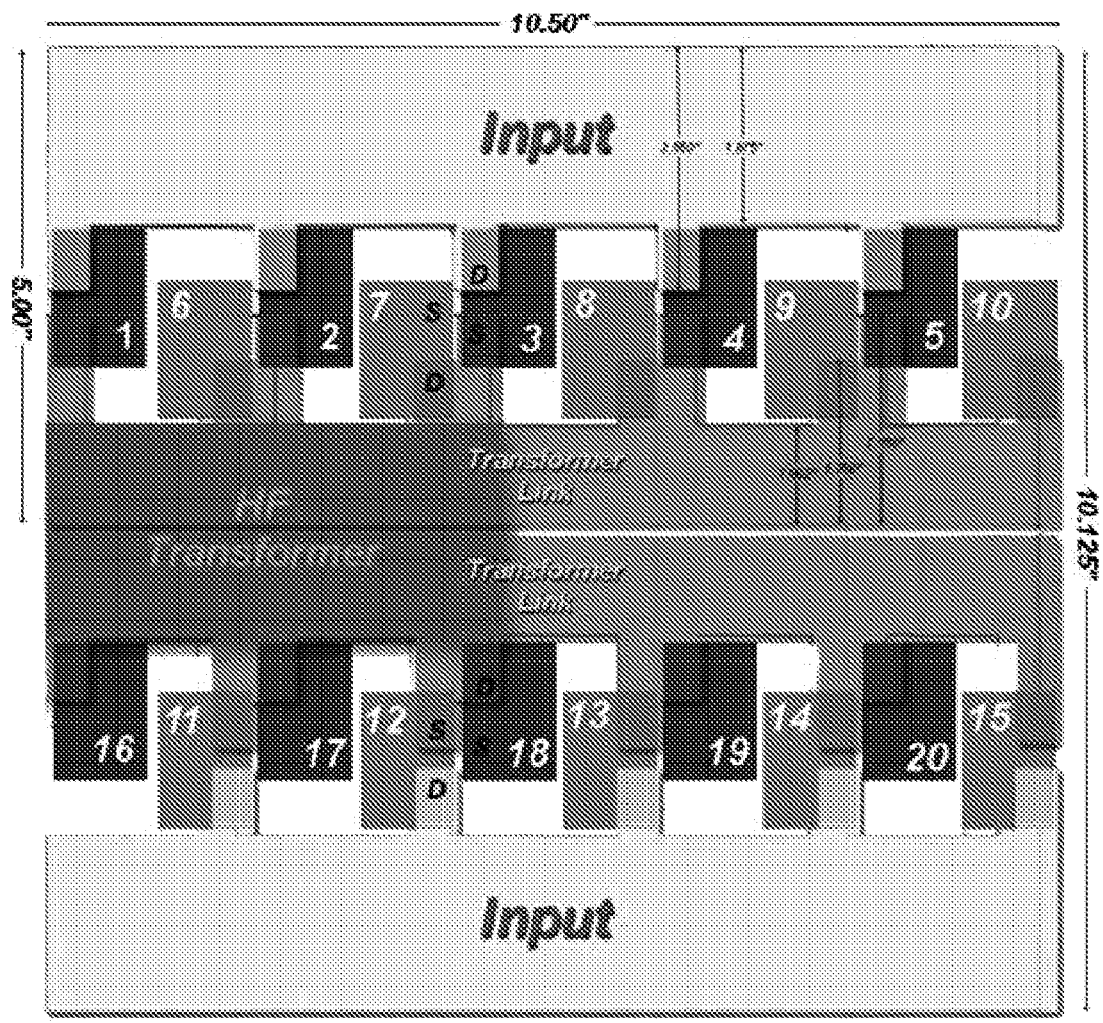
FIG. 3 is a top view illustration of a prototype primary.
Figure 5:
FIG. 5 is a top down view of device layout.

AC currents are supplied via the input energy storage capacitors connected across the input. The source-terminals of these switches are then connected to the high frequency transformer through the transformer link bus which is shown in FIGS. 3 and 5. Also connected to this bus are the drain-terminals of the remaining FETS (numbered 6-10 and 16-20).

The source-terminals of these components are connected to the heatsink that provides the return path for the current.

The output of the HF transformer can be center tapped. The hot-legs of the transformer secondary can be connected to a full-bridge rectifier and the center tap can serve as a neutral providing symmetrical positive and negative voltage with respect to this reference. The output of the rectifier circuit can also be fed into a two pole L-C filter to provide a low ripple DC output.

The layout illustrated in FIG. 1 is more easily understood looking at FIG. 3 where the two rows of MOSFETs are shown surrounded by the copper bus work. The relationship of this layout to the two legs of the full-bridge circuit described in FIG. 2 is evident in how the MOSFETs are arranged. The FETs are labeled 1-20 in FIG. 3. Also shown in FIG. 3 is the placement of the high frequency transformer underneath the transformer link bus. The heatsink separates the transformer from the high frequency bus.

Figure 4:
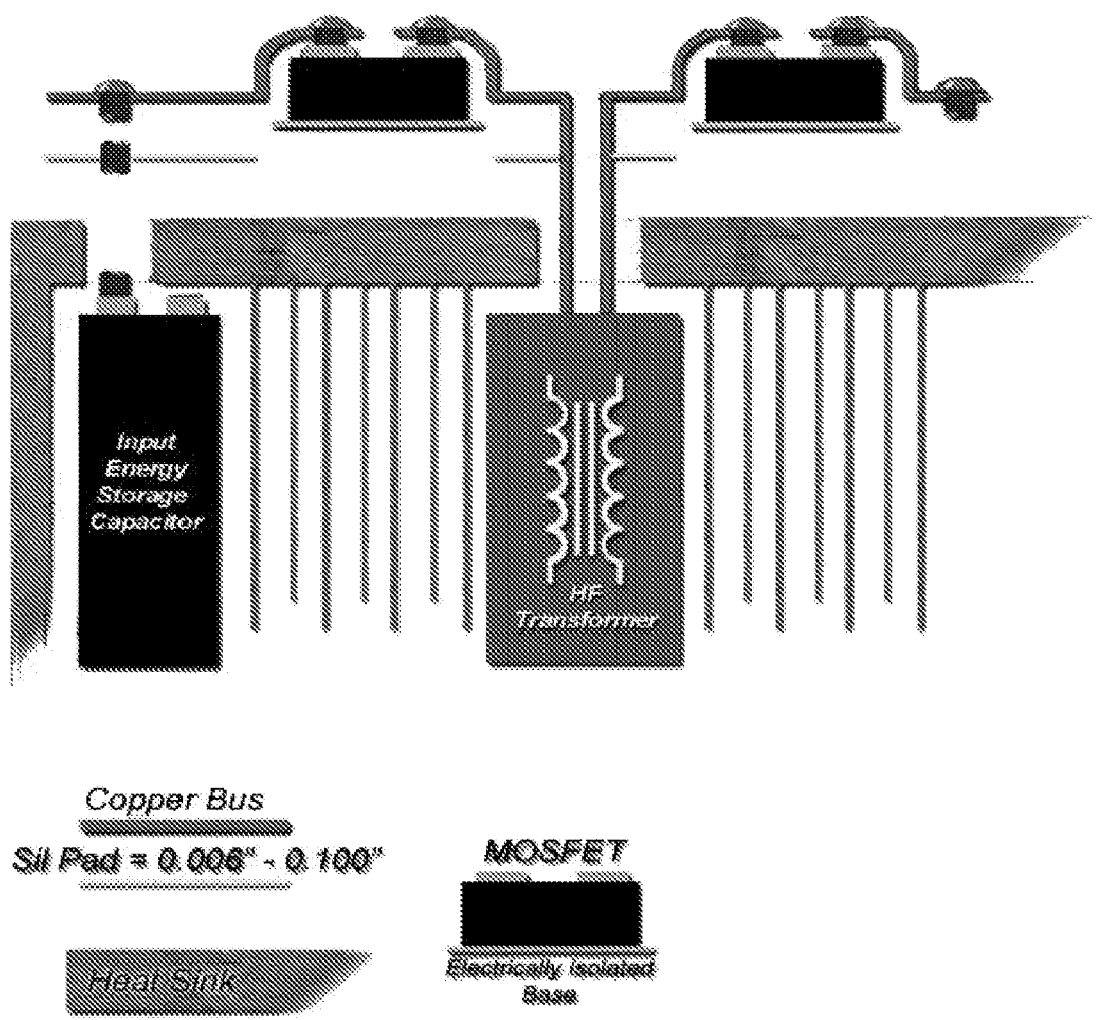
FIG. 4 is a cross-sectional illustration of a device primary.

Further insight into this design is illustrated in the cross-section shown in FIG. 4. From this exploded view the multiple layers that make up the primary components can be seen. An explanation of current flow during one half switching cycle is as follows. High frequency current flows from the energy storage capacitor on the right through the first MOSFET into the transformer through the second MOSFET and is then returned to the negative terminal of the capacitor through the heatsink. The electrically isolated base of the MOSFETs allows them to be bonded directly to the heatsink. As can be seen in FIG. 4, the switches can be placed over the heatsink fins and not over the cavities for the transformer and capacitors. This arrangement allows the heatsink to more efficiently transfer heat to the environment.

To maximize the usage of a viable volume and thereby increase power density, cavities can be created in the heatsink for components such as the transformer and input energy storage capacitors. This assembly coincides well with the low inductance philosophy for the device as well as providing extra hardening for key components.

According to one embodiment, a split input bus can be used wherein each side has its own energy storage capacitors. All high frequency AC current is provided by the input capacitors. These capacitors were placed as closely to the MOSFETs as possible thereby reducing the overall AC current path and further decreasing the total primary loop inductance and parasitic resistance. The placement of the energy storage elements also has the distinct advantage of decoupling the AC requirement of the input from the external source of power. All power delivered by the source is essentially DC.

FIG. 5 is a top down image of an actual prototype of a converter device. In this view, both the primary and secondary sections of the converter are visible and key components have been labeled. Those components which are located on the side of the heatsink which is shown in FIG. 5 are labeled in bold. Referencing this photo to the drawings in FIGS. 3 and 4, the assembly of the device becomes apparent.

Figure 6:
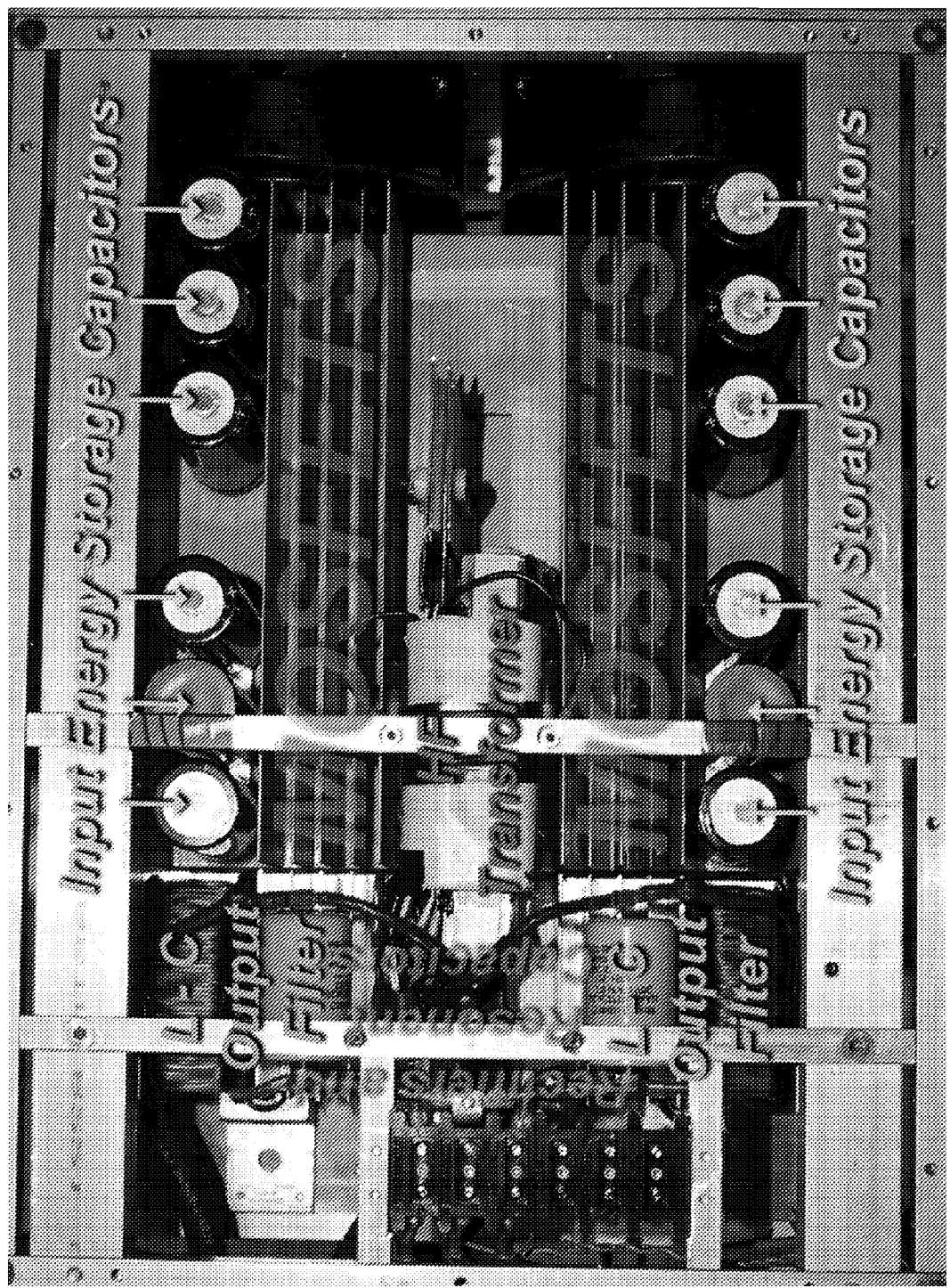
FIG. 6 is a bottom view of a device layout.

FIG. 6 further emphasizes this relationship and shows the placement of the aforementioned components. The heatsink was constructed in such a way as to maximize the surface area in the region in which the MOSFETs are located. This can be seen in the distinct heatsink fins visible in FIG. 6.

A second embodiment of the proposed device has also been constructed using a different layout. One reason for the differences in the two arrangements is the MOSFETs themselves. Moreover, the switches used in this second embodiment do not have the benefit of an isolated base. Therefore, the switches were bonded directly to the high frequency bus with the bus remaining electrically insulated from the heatsink.

Figure 7:
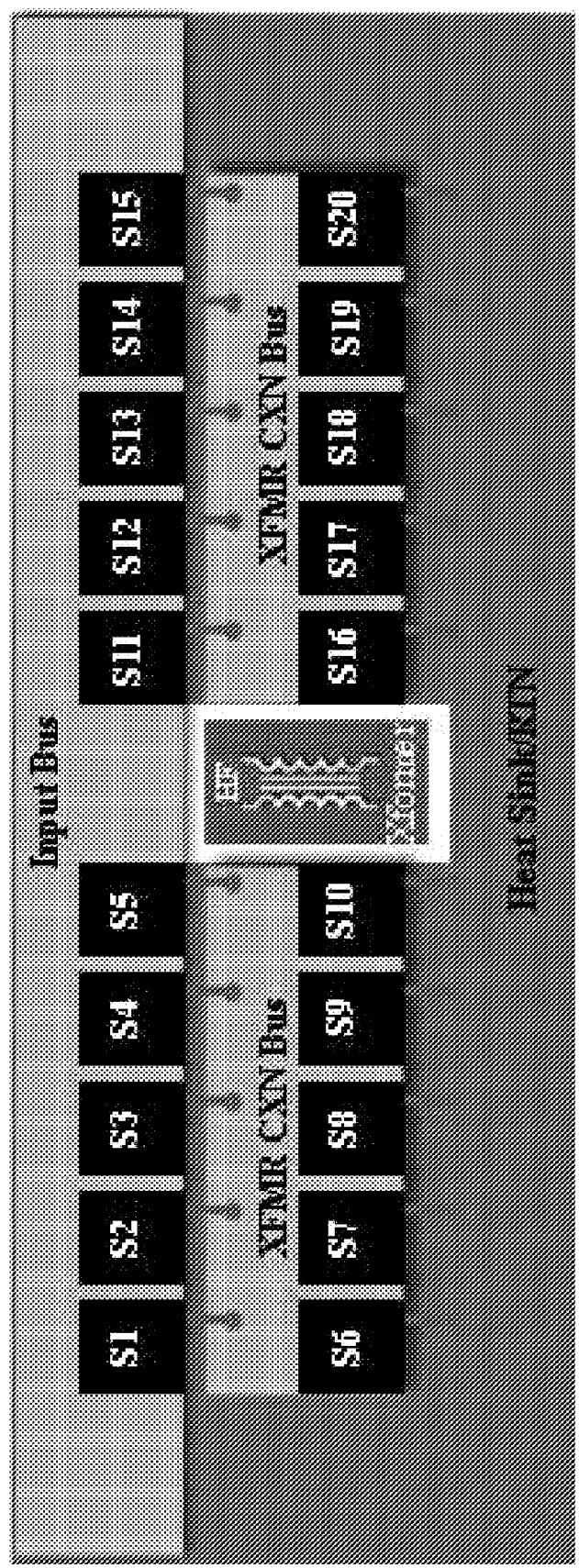
FIG. 7 is a schematic of a layout of a device embodiment.
Figure 8:
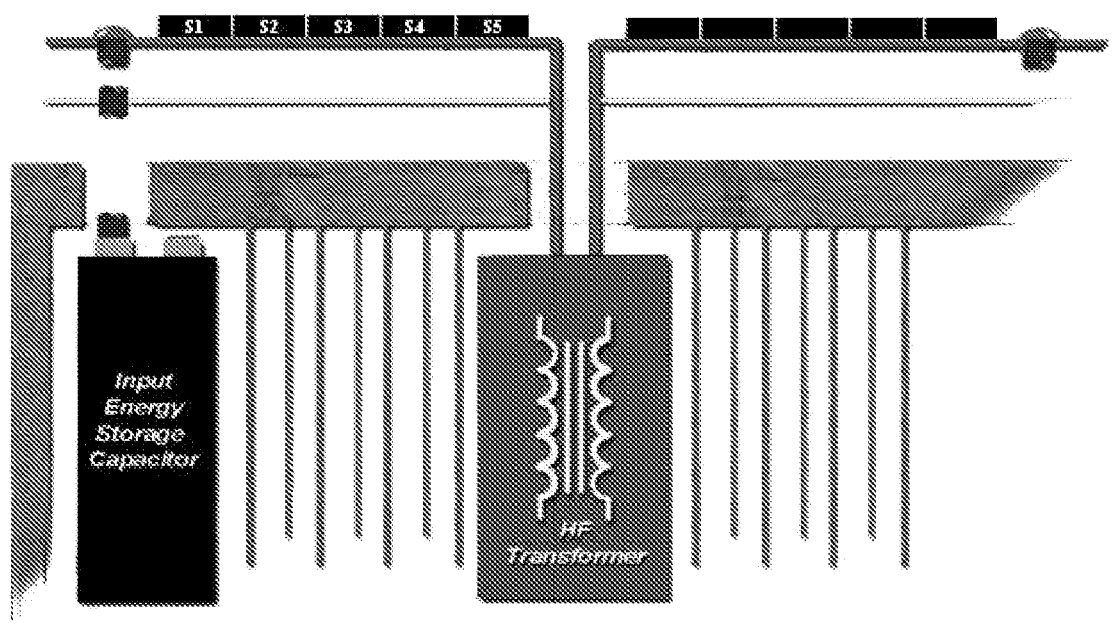
FIG. 8 is a cross-sectional view of the embodiment illustrated in FIG. 7.
Figure 9:
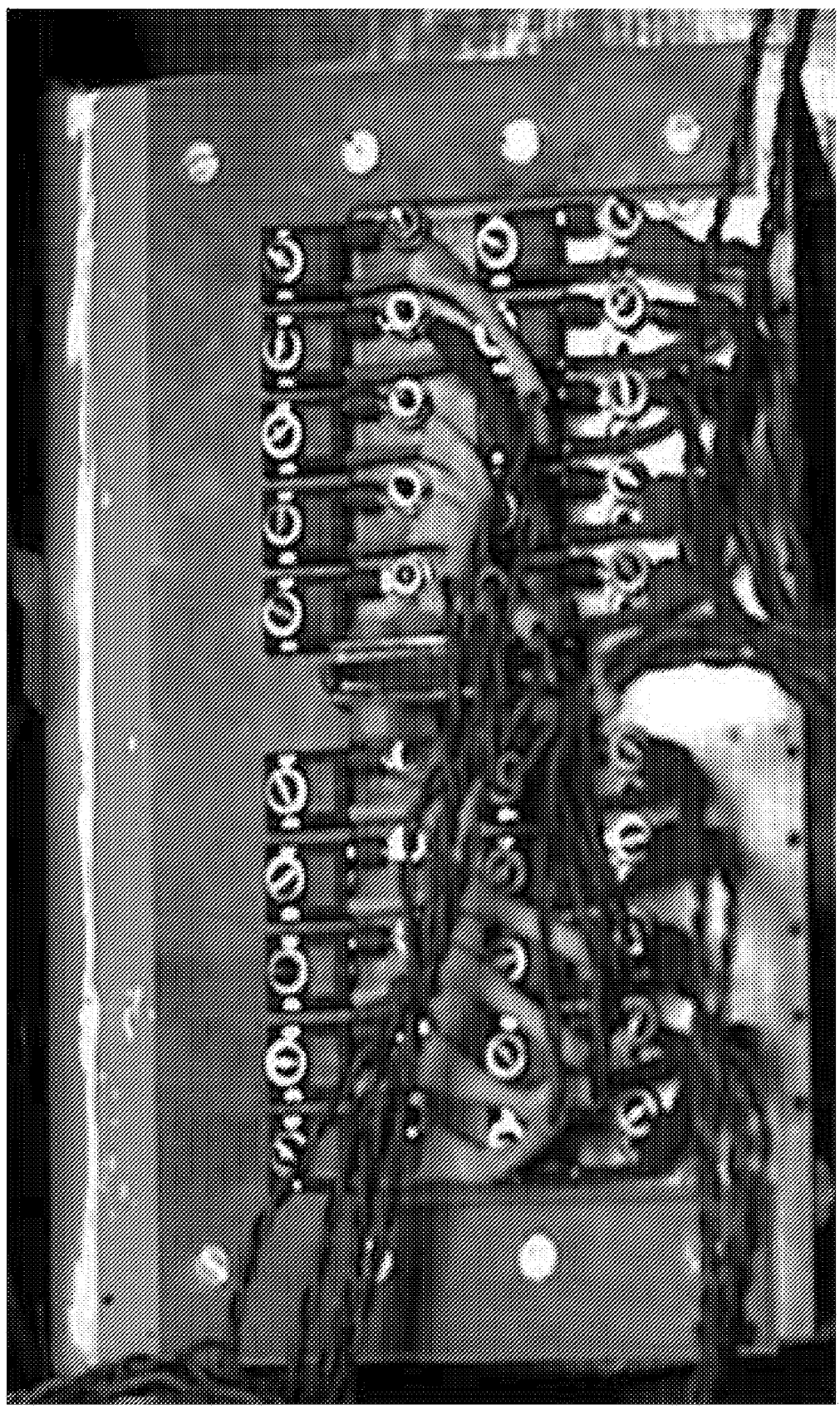
FIG. 9 is a primary of prototype for the embodiment illustrated in FIG. 7.

FIGS. 7 and 8 illustrate this alternative design. The labeling of the MOSFETs in FIG. 7 correlates to the labeling of the FETs in FIG. 2. FIG. 9 shows a photo taken of the prototype for this layout.

In this second embodiment the input bus is not split into two sections. Rather, all of the switches on the high side of each leg are connected to a single bus. There still remain two separate transformer link sections where the switches on the low side of each leg are mounted. This layout preserves the same concept of minimizing the cross-sectional area of the current path to reduce loop inductance as the first embodiment.

All of the design considerations previously mentioned factor into the construction of an improved low input voltage, high power, high power density, DC-DC boost converter. As set forth above, prototypes for two embodiments of the device have been built and tested. The implementation of a parallel load resonant converter as the power conversion topology for this device also makes it a valuable candidate for use as a high frequency AC source for an AC link inverter.

Power Converter Comprising a High Frequency AC Link and Power Modulation Techniques for Use Therewith The systems and methods described herein rectify and impulse excites a low-pass filter with AC voltage pulses with a zero average value. As set forth above, DC-AC inverters with a high-frequency AC link and pulse width modulated (PWM) cycloconverters have been disclosed which rectify and impulse excite a low-pass filter with AC voltage pulses with a zero average value [7-9]. However, the method of forming the high-frequency AC voltages differs from that described in these references in several important respects. In addition, the method of selecting the correct sequence of rectified integral half-cycle voltage waveforms required to generate the correct low-frequency AC voltage output from the filter also differs from that described in the references. As a result, the methods described herein have important advantages.

Moreover, the DC-AC inverters described in references [7-9] typically have a source of AC voltage that is continuous in waveform. These inverters also typically employ a PLR inverter operating in continuous conduction mode. Further, these inverters employ pulse density modulation as the algorithm for both selecting the sequence of rectified pulses and as the means for providing closed-loop feedback control of the output waveforms. Pulse density modulation as described in these references requires real time calculations, either of an analog or digital nature. Excessively complicated or unobtainable high-bandwidth processors are therefore required to implement this modulation in real time. This tends to limit applications to relatively low frequency AC-link sources (e.g., 20 kHz) [9].

In contrast, power inverters as described herein can employ significantly higher frequency AC-link sources (e.g., 400 kHz). Also, the AC link invariably involves a capacitor and an inductor in parallel to form a resonant "tank" circuit to support the AC link voltage under reactive power conditions. To maintain link voltage regulation, as quoted in reference [9] " . . . power balance between the load and source must be done actively." This involves additional control hardware that increases the system complexity and cost. Also, the systems and methods described herein have a source of AC voltage that is discontinuous in waveform. According to one embodiment, the systems comprise a PLR inverter operating in discontinuous conduction mode. Further, discretized sinusoidal waveform modulation is used as the algorithm for selecting the sequence of rectified pulses. Feedback control of the low-frequency output voltage requires only a low-bandwidth sensor and processor, which simply selects a "solution" to the algorithm with the correct amplitude duty factor. The discretized sinusoidal carrier wave modulation taught here can be implemented with calculations done by a realtime processor. Alternatively, multiple pre-calculated solutions representing different amplitude duty factors and/or different values of the fundamental frequency (e.g., 50, 60, and 400 Hz) can be stored in electronic memory. The least expensive, fastest controllers (e.g., FPGA's) can be used with the pre-calculated approach. Therefore, there is no practical limit on the frequency of the AC source voltage imposed by modern controller technology. The AC link invariably involves only a resonant capacitor. The link voltage (i.e., the resonant capacitor voltage) is inherently (i.e., passively) stable without active control. When the embodiment includes a PLR inverter with reasonably low equivalent series resistance, the link voltage regulation is excellent under all real and reactive power conditions.

A quantitative investigation was conducted into the most appropriate modulation technique to employ in the design of the Power Converter (ADPC). This investigation resulted in a decision to utilize digitally encoded sinusoidal carrier-wave modulation. Calculations suggest that this approach can be practically implemented with acceptable total harmonic distortion in the line-to-line output voltage by hardware that satisfies the following technical objectives:

To deliver 208 VAC (line-to-line), 3-phase power at an electronically selectable 50, 60, or 400 Hz.

To draw power from a 400-A, 28-VDC HMMWV alternator.

To achieve high power density through high conversion frequency and low part count.

To utilize a full bridge parallel load resonant converter in discontinuous conduction mode as a source of high-voltage (~600 V peak) high-frequency (~400 kHz) pulses.

Three techniques were investigated. They were:

State variable feedback controlling bipolar impulses applied to a phase-to-neutral LC filter.

Space Vector Modulation (SVM) of bipolar impulses applied to a phase-to-neutral LC filter.

Sinusoidal Carrier-Wave Modulation (SCWM) of bipolar impulses applied to a phase-to-neutral LC filter.

The first technique was judged less practicable because it requires high-bandwidth feedback and was rejected in favor of one of the other two techniques. SVM and SCWM are in the class of "pre-programmed" techniques and thus do not require high-bandwidth feedback.

SVM was also determined unsuitable for an inverter application which must act as a high quality line-frequency AC voltage source. However, the SVM approach was found to have attractive properties as a variable-frequency, variable-voltage motor drive (also known as a "Volt-Hertz scalar drive") commonly used to drive variable-speed induction motors.

The systems and methods described herein can be used in mobile power systems that are compatible with existing U.S. Army vehicles. In particular, as a technology demonstration objective, the inventors are currently developing technology for converting 28 V DC electrical power common to the U.S. Army High Mobility Multi Wheeled Vehicle (HMMWV) into a power source useful for mobile air defense systems. The HMMWV is capable of accepting a specialized high-amperage alternator that can supply up to approximately 10 kW of electrical power. A standard version, rated at 28 VDC and 400 A, is manufactured by Niehoff and is available from the U.S. Army supply system. A research version, rated at 28 VDC and 500 A, has been acquired for research purposes by Mississippi State University (MSU).

The HMMWV has been used to provide power to the Army Short Range Air Defense (SHORAD) system. In the field, a 10-kW diesel motor generator powers the radar. A HMMWV tows the trailer-borne radar, while the diesel generator is accommodated in the bed of the HMMWV. The RPT program has already demonstrated that the 400-A alternator installed in a HMMWV can provide the necessary electrical power to operate the Sentinel radar. Currently, a two-stage conversion process representing prior art is required to power the radar. First, a DC-DC converter steps up the 28 VDC available from the alternator to 400 VDC. Second, a separate DC-AC inverter converts the 400 VDC to the 208-VAC, 3-phase, 400-Hz alternating current required by the radar.

According to the systems and methods described herein, the second separate DC-AC inverter can be eliminated by incorporating this function into the ADPC itself. In this manner, the functionality can be maintained while achieving a significant reduction (e.g., approximately 50%) in the size and weight of the overall power conversion system.

The modulation strategy is the algorithm to be applied to the inverter switches to convert the characteristic waveform produced by the PLR converter into the three-phase line-frequency voltage waveform required by the radar. Following this selection, it is possible to formulate performance specifications and to create a point design that establishes a number of internal specifications and component requirements. The modulation algorithm is well known to place fundamental limits on the signal amplitude available from a given input voltage and to drive the design of the filters required to achieve acceptable limits to harmonic distortion. Secondary questions, such as the maximum switch stress, cannot be answered until a basic technical approach is selected and a point design analyzed. The point design will, in turn, allow for specification of subcomponent ratings, such as switching transistors, transformers, and filter components. However, improper selection of the modulation approach can result in "can't get there from here" performance in key figures of merit, such as total harmonic distortion of the line-frequency output voltage. This matter must be reviewed carefully and quantitatively from first principles. That has now been accomplished; and the objective of this report is to document that effort.

Sinusoidal Carrier-Wave Modulation (SCWM)

Sinusoidal Carrier Wave Modulation (SCWM) is described below. In this section, the basic inverter topology will be introduced and critical waveforms defined. Mathematical treatment of the filter performance and spectral and temporal examples of the output voltage are also calculated.

Figure 10:
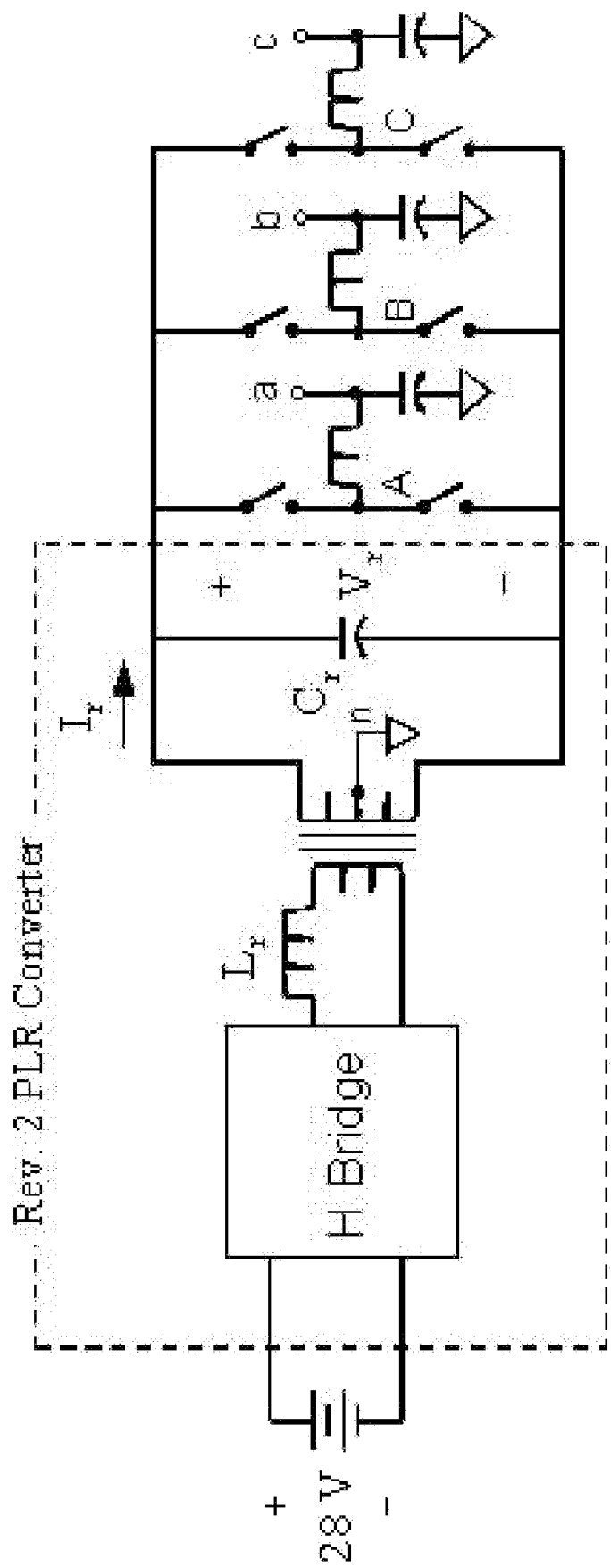
FIG. 10 is a schematic of a system comprising a core PLR converter according to a further embodiment wherein a six-pulse bridge is used instead of output rectifiers to provide the inverter function and wherein a three-phase load is connected to terminals a-b-c.

SCWM is a well-known technique employed in both single phase and three phase pulse-width modulated inverters. A complete description of the basic operating principles can be found in [18]. In this application, it is assumed that a parallel loaded resonant (PLR) converter operating in the discontinuous conduction mode is supplying a continuous train of alternating polarity quasi-sinusoidal high-voltage pulses at a high repetition rate on the order of 400 kHz. A six-pulse inverter will deliver these pulses according to an appropriate modulation algorithm to three multi-pole passive filters connected to the three-phase load at the output. FIG. 10 illustrates the overall system concept. The result will be a low-THD line frequency sinusoidal voltage waveform that meets minimum specifications for a voltage source inverter. Adjusting the repetition rate of the high-frequency voltage pulses and/or other changes to the algorithm will allow the frequency of the three-phase sinusoidal output voltage to be electronically selectable.

Unlike the prior-art power converter described above, the high-frequency pulses will not be converted to a 400-V DC voltage first. Instead, the principle of the "high frequency AC link" will be employed [8]. However, there are significant differences between the approach analyzed here and that dominating the literature of high-frequency AC link converters, namely so-called pulse density modulation (PDM). PDM is different from SCWM, both in the method of SCWM described in the prior art and in the method proposed here. One liability of the AC link power converter is the requirement for bilateral switches in the six-pulse inverter. This arises because the link voltage can swing both positive and negative, so the switches must be capable of isolating either polarity from the output. Traditional semiconductor power switches suitable for the high frequency switching proposed here are capable of blocking only one polarity of applied voltage. However, several multiple-device combinations are possible which resolve this issue [7].

Waveform Definition

In the previous subsection, a specific system concept was revealed in FIG. 10 and general characteristics where assigned to the waveforms available to the inverter, but waveform specifics were omitted. This subsection provides that information.

The PLR converter delivers a quasi-sinusoidal (at no-load, perfectly sinusoidal) current pulse to the resonant capacitor which is shown in FIG. 10.

Figure 11:
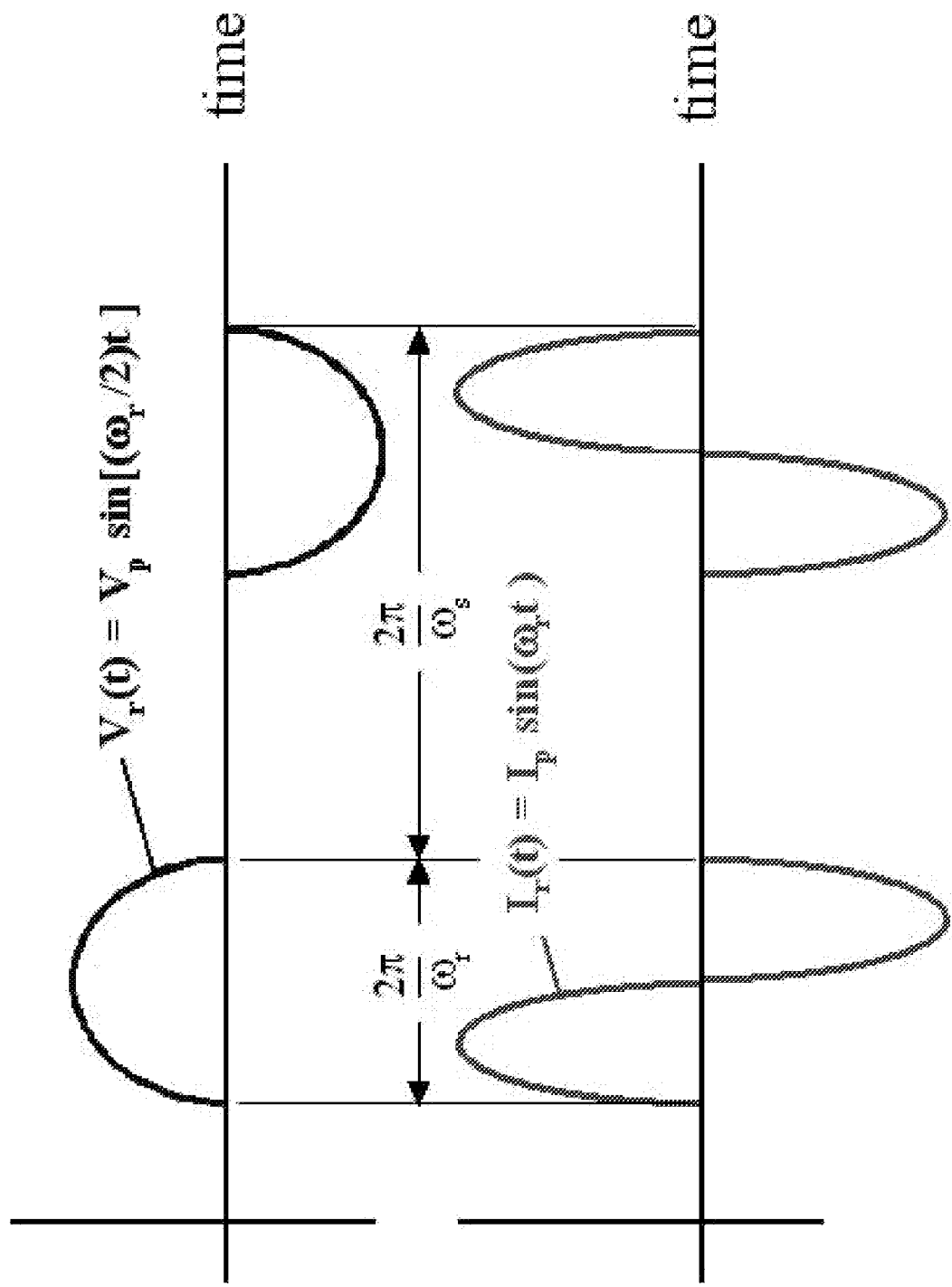
FIG. 11 shows waveform definitions for the idealized resonant capacitor voltage, $V_r(t)$, and the resonant capacitor current, $I_r(t)$, for the core PLR converter of FIG. 10 operating in the discontinuous conduction mode.

FIG. 11 illustrates a typical, but idealized current pulse. The current pulse has a frequency of $\omega_r$, which is fixed by the magnitude of the resonant capacitance and by the equivalent series inductance of the PLR converter as seen by the capacitor reflected through a step-up transformer. A PLR converter produces a quasi-sinusoidal voltage across the resonant capacitor with a nominal frequency of $\omega_r/2$. Each half sinusoid, or "haversine," represents an impulse that can be applied through the half-bridge phase legs to impulse excite the output filters (and thus deliver or remove "volt-seconds" from the load). FIG. 11 illustrates the haversines and their relationship to the resonant current pulses. It should be noted that the resonant current pulses flow into the resonant capacitor only, but that the resulting voltage pulses can be switched to the load through the half-bridge phase legs. FIG. 11 also illustrates the switching period, which is defined by the period between resonant current pulses, which is also the time between haversines. The switching frequency $\omega_s$ is defined by this period as shown. The haversines alternate in polarity, but either polarity can be applied to the load with the same or opposite polarity (as required by the modulation algorithm) by appropriately selecting which switch in the half bridge is open or closed. The typical PLR resonant frequency is approximately 400 kHz. The peak resonant capacitor voltage $V_p$ can be adjusted by changing the transformer turns ratio. A ratio of 21 produces a peak value just under 1200 V.

Modulation Algorithm

The specific SCWM algorithm is described below. This will be done in two parts. First, the classic method of prior art in which a sinusoidal control signal is sampled with a triangular "carrier wave" to form the PWM modulation envelope [18] is modified to produce an explicitly discrete second level of modulation compatible with the PLR converter pulse train. Second, a digital system for implementing the modulation algorithm is described which, among other methods, could be implemented with a programmable logic array (PLA) or its practical extension known as the field programmable gate array (FPGA).

Sinusoidal Carrier Wave Modulation (SCWM)

Conventional SCWM

The conventional SCWM technique is well known and is often applied to both single-phase and three-phase inverter applications [18]. It is an example of a "preprogrammed" modulation technique in that pulse width modulated output voltages coded with the SCWM technique are guaranteed to produce a waveform (following filtering), that is dominated by the fundamental (line-frequency) harmonic. Furthermore, in the analog version, undesirable harmonics in the unfiltered waveform begin near the sampling frequency provided that synchronous modulation is used. This can reduce the size of the output filter significantly when high sampling frequencies are used (which requires fast controllable switches in the six-pulse inverter bridge).

Figure 12:
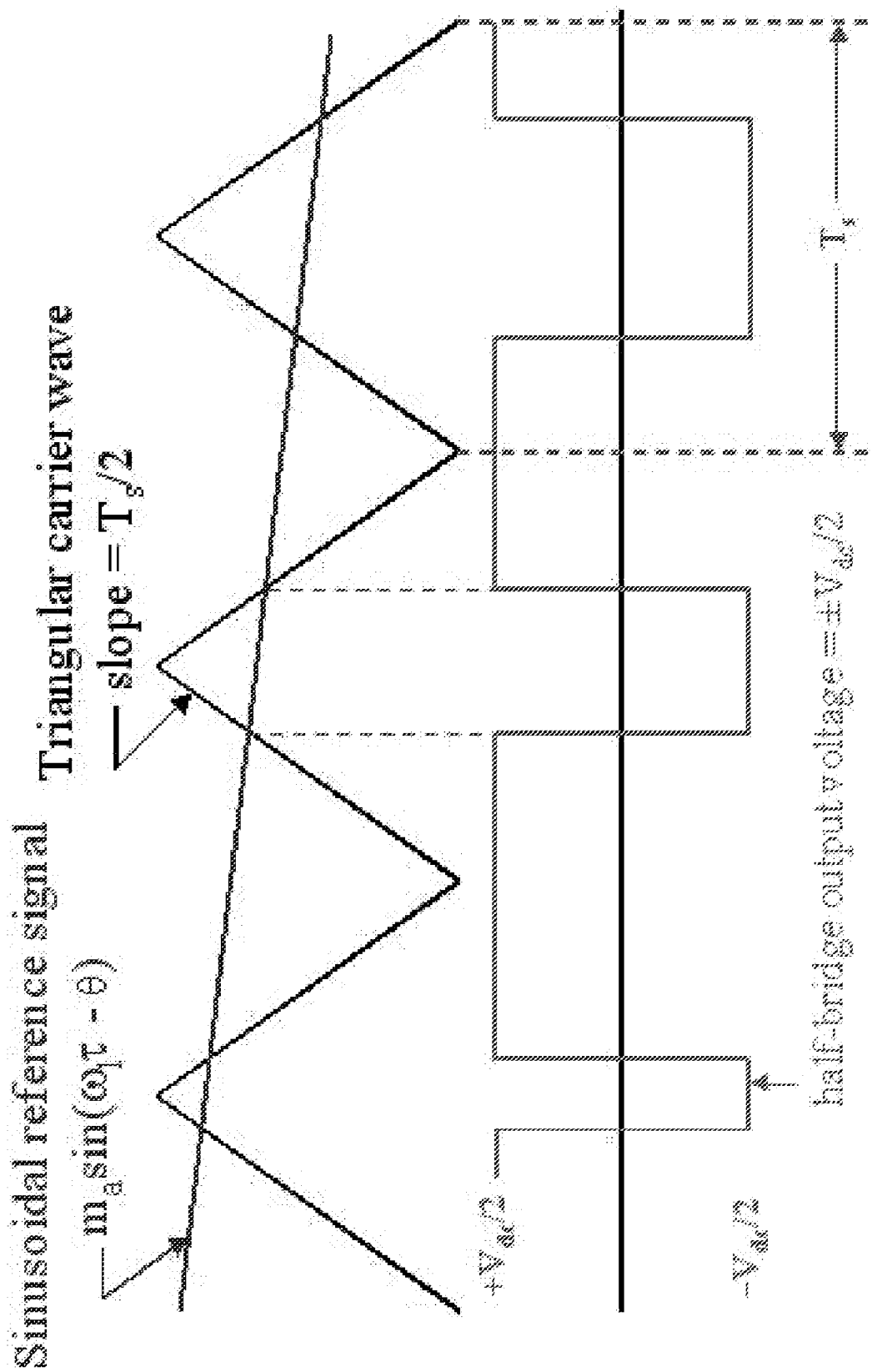
FIG. 12 shows a conventional sinusoidal wave carrier modulation (SCWM) applied to a bipolar PWM in a DC link inverter.

FIG. 12 defines the variables employed to code SCWM into a bipolar PWM voltage. If a DC link were used in FIG. 10 (instead of an AC link), the lower square-wave labeled "half-bridge output voltage" would be measured at any of the three half-bridge output nodes (nodes A, B, or C) measured with respect to the neutral node n. The upper two waveforms (reference signal and triangular carrier wave) exist in the PWM controller only. The two switches in each of the three half bridges are controlled by a comparator that monitors the value of the triangular carrier wave, $V_{tri}(t)$, with respect to the sinusoidal reference signal, $V_{ref}(t)$. The upper switch is closed and the lower switch is open when $V_{tri}(t)<V_{ref}(t)$ such that $V_{Xn}=+V_{dc}/2$ (where X=A, B, or C). The switches are controlled into complementary states (upper switch open, lower switch closed) when $V_{tri}(t)>V_{ref}(t)$ so that $V_{Xn}=-V_{dc}/2$. The result is the bipolar output pulse shown in FIG. 12, which is delivered to the output filter. The output filter, with a cutoff frequency above the fundamental harmonic, but below the higher-order switching harmonics, produces a reduced THD sinusoidal output voltage. Each half bridge is controlled by a different reference signal, with each reference signal delayed by a phase angle of 120° in order to produce conventional three-phase voltage waveforms.

Several important variables are defined in FIG. 12. The first is the conventional or analog sampling period $T_s$, which is the period of the triangular carrier wave. From FIG. 12, we recognize that $V_{tri}(t)$ intersects or "samples" $V_{ref}(t)$ following the start of the triangular period. Assuming $V_{tri}(t)$ and $V_{ref}(t)$ are synchronized, then the two signals have a common delay given by an integer multiple of sampling periods, defined by the product of an integer j and $T_s$. If the time reference frame is shifted to the beginning of each triangular wave such that $t=\tau-jT_s$, then:

$$V_{tri} = \frac{t}{\frac{T_s}{2}}, \tag{1}$$

for $0 \leq t \leq T_s/2$, and $$V_{ref} = \frac{m_a \sin[\omega_l(t+jT_s)]+1}{2}, \tag{2}$$

where $m_a$ is the amplitude modulation factor and $\omega_l$ is the angular line frequency. Provided that $m_a$ is in the linear range ($0<m_a\leq 1$), then $V_{tri}(t)$ and $V_{ref}(t)$ will intersect at one point each half period of $V_{tri}(t)$. Equating (1) and (2)

$$\frac{t}{T_s/2} = \frac{m_a \sin[\omega_l(t+jT_s)]+1}{2} \quad (3)$$

permits the time at the point of intersection to be determined by solving the resulting Equation (3).

At this point we make an assumption, namely, that the sampling rate is relatively high, such that the change in the magnitude of Equation (2) over the short half period of the triangular wave is negligible (the conditions under which this is true will be derived next). If so, we can truncate the Taylor series expansion of the right hand side of (3) about $jT_s$ to the second (linear) term:

$$\frac{t}{T_s/2} = \frac{m_a[\sin(j\omega_l T_s) + \cos(j\omega_l T_s)\omega_l t]+1}{2}. \quad (4)$$

It is customary for the sampling frequency to be a multiple of three with respect to the fundamental frequency of the reference signal. This ensures that the bipolar PWM signal will have odd symmetry. Selecting 12n samples during each period of the reference signal, where n is a non-zero integer, satisfies the triplet requirement and also allows the reference signal period to be divisible by two and four. Then $$12nT_s = \frac{2\pi}{\omega_l}, \quad (5)$$

where $2\pi/\omega_l$ is the period of the reference signal. Substituting (5) into (4) and solving for t yields:

$$t = \frac{m_a \sin(j\omega_l T_s)+1}{\omega_l\left[\frac{24n}{\pi} - m_a \cos(j\omega_l T_s)\right]} \text{ or} \quad (6)$$

$$t = \frac{m_a \sin\left(2\pi \frac{j}{12n}\right)+1}{\omega_l\left[\frac{24n}{\pi} - m_a \cos\left(2\pi \frac{j}{12n}\right)\right]}. \quad (7)$$

Equation (7) illustrates that there are only 3n discrete solutions for t, which proves that SCWM is a digitizing function. The condition that satisfies the approximation employed in (4) is that n>3.

In Equation (7), $m_a$ is a continuous variable. While in the linear range ($0<m_a\leq 1$) the amplitude of the fundamental harmonic of the output voltage is directly proportional to $m_a$, which can be written as [18]

$$(\hat{V}_{xn})_1 = m_a V_{dc}/2, \quad (8)$$

where $(\hat{V}_{xn})_1$ is the peak amplitude of the fundamental harmonic of the phase voltage $V_{xn}(t)$ (where x=a, b, or c). The derivation of Equation (7) applies to an ideal analog modulator controlling an inverter with a constant dc input voltage. However, the device shown in FIG. 10 has a high frequency AC link, in which the voltage pulsates according to the illustrations in FIG. 11; therefore, in this case the additional analysis in the next section is required to understand how to apply SCWM.

Discrete SCWM

The fundamental issue with synthesizing a low THD line-frequency sinusoidal voltage using the output of a PLR converter operating in the discontinuous conduction mode is that the output comes in discrete voltage pulses with fixed temporal shape (determined by $\omega_r$) but adjustable pulse repetition frequency (determined by $\omega_s$). Therefore, there is no need for the switches in the half bridge phase legs to modulate voltage, as was the case for the conventional dc link inverter of prior art. Instead, the half-bridge switches merely rectify, i.e., change the sign of, the voltage pulses. The advantage is that zero voltage switching is possible, which allows efficient, high conversion-frequency operation. In either case a filter is needed to isolate the inverter output (which should be sinusoidal) from the pulsating voltage supplied by the half bridge. To apply the fundamental SCWM technique, the AC link inverter supplies equivalent volt-seconds to the filter, and the PLR pulses are integrated whole (i.e., half-bridge switches cannot change state while the resonant capacitor voltage is non-zero).

The problem then boils down to integrating an integral number of PLR pulses in the output filter. The rules do impose some constraints. The PLR converter cannot dynamically change the resonant frequency or the amplitude of the resonant capacitor voltage. To maintain frequency stability at the output of the inverter, the switching frequency of the PLR converter is synchronized to the frequency of the reference signal.

Thus the SCWM controller is constrained to integrating a stream of pulses each delivering a fixed quantum of volt-seconds (area) at a fixed pulse repetition frequency (PRF). The only available degree of freedom is the polarity of each pulse, which can be changed on a pulse-by-pulse basis. This problem is similar to digitized SCWM, which has become popular in motor drives. In this case, the PRF of the PLR converter ($\omega_s$) is equivalent to the sampling rate of the digital modulator, which is a different, higher sampling rate than that of the analog SCWM modulator ($1/T_s$). Prior to each PLR voltage pulse the digital SCWM controller must choose which polarity to switch to each of the three filters. The states of the half-bridge switches are set according to the polarities required by the algorithm and the polarity of the next voltage pulse, which alternates.

Figure 13:
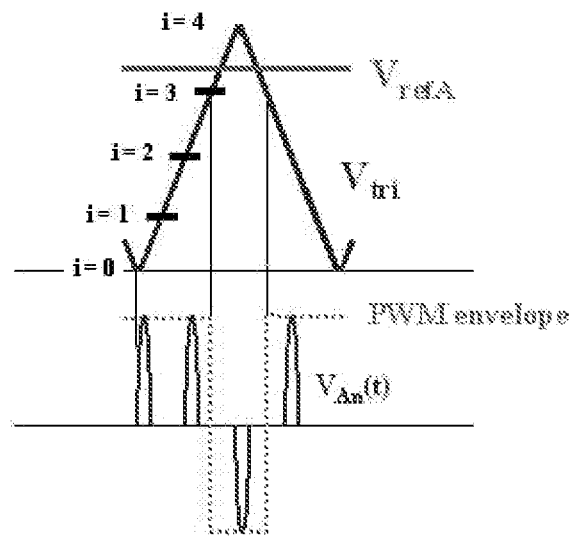
FIGS. 13A and 13B illustrate a digitized SCWM applied to an inverter supplied by a PLR converter operating in discontinuous conduction mode showing in (a), $V_{refA}$ intersecting the triangle wave in the second interval: i=2 and showing in (b), at some later time, $V_{refA}$ intersecting the triangle in the fourth interval: i=3.
Figure 13:
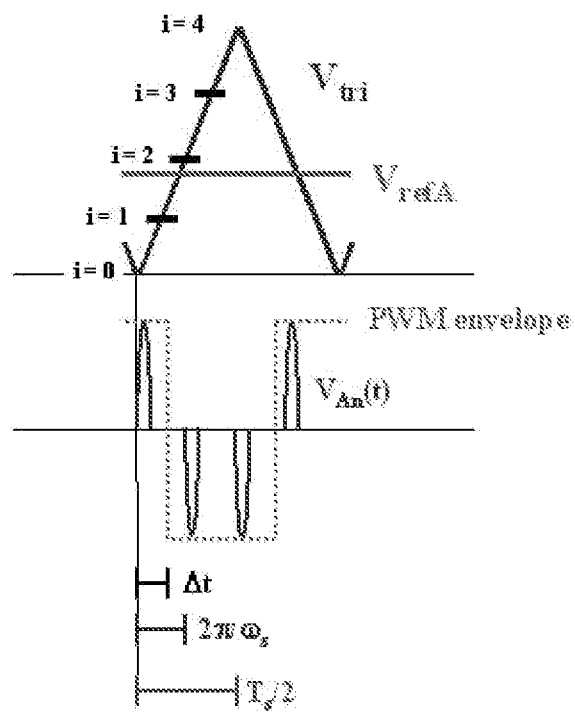

As shown in FIG. 13, the decision is determined by the PWM envelope of the equivalent dc link inverter, which is in turn based on the usual intersection of the reference signal and the triangular carrier wave. However, because the switches cannot change state during a PLR voltage pulse, then the triangular wave must be partitioned or "digitized" into intervals, thus quantizing the effective pulse width of the envelope to accommodate integral numbers of pulses. In FIG. 13 we hypothesize that the PLR switching frequency is fixed such that a predetermined number of PLR pulses will be generated during each SCWM sampling period $T_s$. Suppose the number of pulses is given by an integer k. For example, in FIG. 13, k=4. Also in FIG. 13, four (i.e., k) equal time intervals $\Delta t$ between t=0 and t=$T_s/2$ are defined. The comparator problem is now simplified to determining in which time interval the reference signal intersects the triangle wave. The time interval $\Delta t$ is defined as $$\Delta t = \frac{T_s/2}{k}. \quad (9)$$

Substituting (5) into (9) yields $$\Delta t = \frac{\pi}{12nk\omega_l}. \quad (10)$$

Equation (7) is normalized by dividing both sides by the $\Delta t$ in (10):

$$\frac{t}{\Delta t} = \frac{12nk}{\pi}\frac{m_a \sin\left(2\pi\frac{j}{12n}\right)+1}{\left[\frac{24n}{\pi} - m_a\cos\left(2\pi\frac{j}{12n}\right)\right]}. \quad (11)$$

The interval on the triangle intersected by the reference signal is given by the value of $t/\Delta t$ calculated from Equation (11) rounded off to the next higher integer.

The number of positive pulses switched to the filter during each SCWM sampling interval defines the state vector i. The number of negative pulses is simply k−i. The state vector is selected for each sampling interval by examination of Equation (11). To eliminate the possibility of a DC voltage at the output of the inverter, the impulse train, when averaged over one period of the fundamental, must have zero average value. This requires symmetry, which is ensured by selecting an even integer for k. In that case, i=k/2 is the state vector that delivers zero average volt-seconds to the filter. The algorithm for selecting the next state vector i is as follows. If $t/\Delta t > k/2$, then i equals the integer calculated by rounding $t/\Delta t$ down to the next lower integer. If $t/\Delta t < k/2$, then i equals the integer calculated by rounding $t/\Delta t$ up to the next higher integer. This algorithm automatically accommodates overmodulation ($m_a > 1$), with the limiting result being square-wave operation as expected.

FIG. 13(*a*) illustrates for the k=4 example the pulse train switched to node A by the controller when i=2. FIG. 13(*b*) illustrates the pulse train switched to node A by the same controller when i=3. In this example, when an odd number of positive pulses are required, i/2+1 positive pulses are delivered first, followed by the k−i negative pulses, and finishing with the remaining i/2−1 pulses. This approach approximates the symmetry of analog SCWM.

Selecting n and k

An integral number of PLR converter pulses must fit within one period of the reference signal, indeed, the total duration of the pulse train over the longest non-repeating interval defines the frequency of the fundamental, which for the inverter can be exactly equal to either 50 Hz, 60 Hz, or 400 Hz. This is achieved by selecting n and k and the switching frequency $\omega_s$ to fix the longest non-repeating interval exactly equal to the period of the line-frequency reference signal $T_1 = 2\pi/\omega_l$. The proper relationship is determined by substituting $\Delta t = \pi/\omega_s$ into Equation (10), resulting in:

$$12nk\frac{\pi}{\omega_s} = \frac{\pi}{\omega_l}. \quad (12)$$

Which becomes:

$$12nk = \frac{\omega_s}{\omega_l} = \frac{\omega_s}{\omega_r}\frac{\omega_r}{\omega_l}, \quad (13)$$

where $\omega_r$ is the resonant frequency of the PLR converter. Since $\omega_r$ is fixed, the ratio $\omega_r/\omega_l$ will take on one of three values corresponding to the three line frequencies. For discontinuous operation of the PLR converter $\omega_s/\omega_r < 1$, so $\omega_r/\omega_l$ represents the largest possible number of PLR impulses per line-frequency period. To satisfy (13) the switching frequency must be selected to ensure that $\omega_s/\omega_l$ is an integer. Therefore, unlike the control of a DC-DC PLR converter of prior art in which the regulation of the output voltage is maintained by adjusting $\omega_s/\omega_l$, in the invention taught here this ratio is fixed at any value of line frequency by the product of n and k.

Digitizing the amplitude of the reference signal introduces a new source of distortion in the filtered output signal that does not exist with conventional analog SCWM. The problem is similar to that of digitally recording an audio signal. The effective sampling frequency, specified by the integer 12n, must exceed the bandwidth of the "baseband" (reference) signal. For low THD digital recording the number of bits of resolution of the analog-to-digital converter must be large to accurately resolve the amplitude of the signal at each sampling instant. Similarly, the integer k represents the amplitude resolution of the discrete SCWM algorithm. Ideally both 12n and k should be large, but their product is limited by Equation (13). The selection of a particular set of individual values for n and k should minimize the total harmonic distortion of the filtered output voltage.

Figure 14:
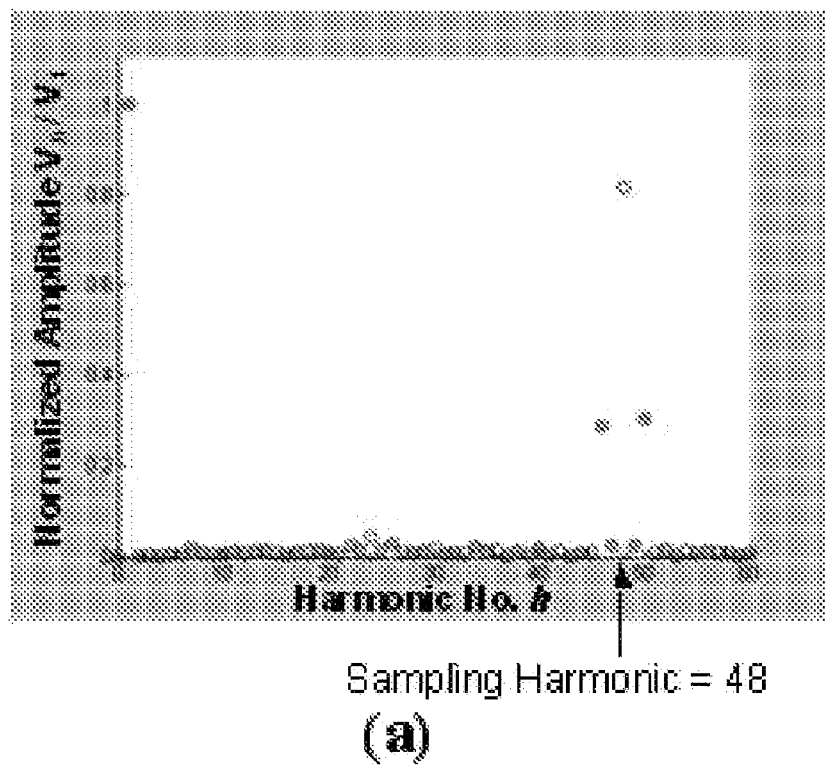
FIGS. 14A and 14B show the calculated normalized magnitude spectrum of the impulse time series resulting from the discrete SWCM algorithm for n=4, k=18, $f_l$=400 Hz, $f_r$=400 kHz, $m_a$=0.95 wherein a plot of the first 60 harmonics of $f_l$ is shown in (a) and wherein a detail of the first 10 harmonics of $f_l$ is shown in (b) and wherein O=line-to-neutral voltage and x=line-to-line voltage.
Figure 14:
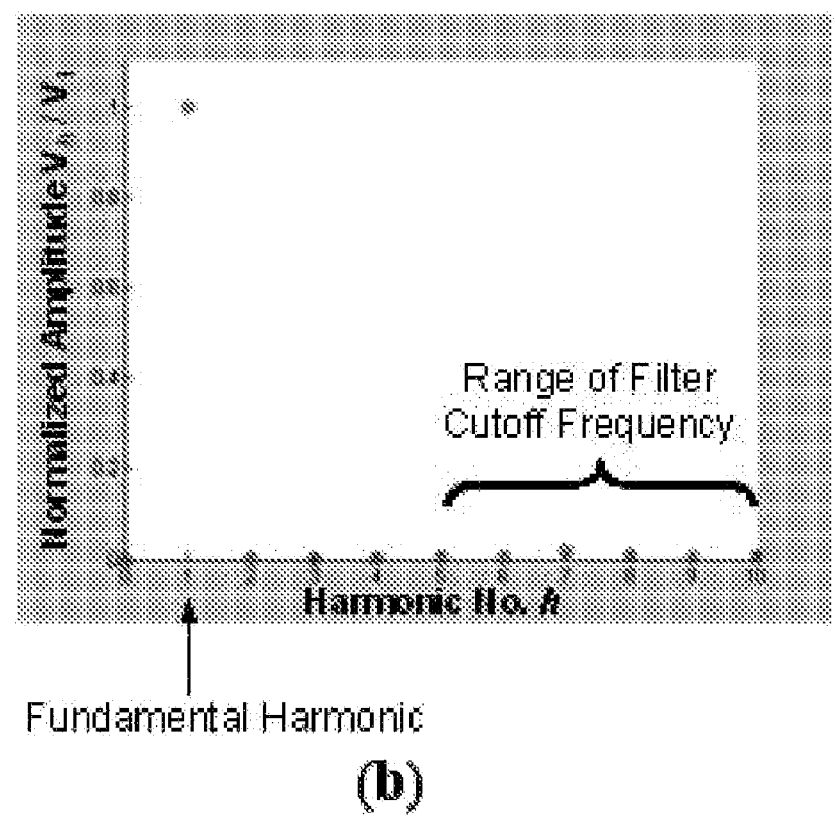

A MATLAB program has been written that models a high-frequency link inverter fed with voltage impulses from a PLR converter operating at constant switching frequency. The program calculates the Fourier Transform of a series of delta functions (i.e., unit impulse functions) delivered to the input of the filter at equally spaced time intervals. Each impulse has the same volt-second product, but either a positive or negative sign as dictated by the discrete SCWM algorithm. The Fourier Transform of a time series of impulses delivered to node A, to node B, and the difference between node A and B is computed, so that the harmonic content of the line-to-neutral ("phase") voltage and the line-to-line ("line") voltage can be estimated. An example of the harmonic spectrum of the time series of impulses generated by the discrete SWCM algorithm for a particular point design in which $f_l = \omega_l/2\pi = 400$ Hz, $\omega_r/\omega_l = 1000$ (i.e., $f_r = \omega_r/2\pi = 400$ kHz), n=4, and k=18 is shown in FIG. 14. The harmonics for both the phase voltage and the line voltage are shown. The line-to-line voltage contains no third order harmonics, as would be expected for a three-phase line-to-line voltage. There are two sources of distortion in the output waveform. First, there are the significant harmonics created by the sampling process, which are centered at or near the sampling frequency harmonic $2\pi/\omega_l T_s = 12n = 48$, and which are clearly observed in FIG. 14(*a*). These are expected, as they are also present in conventional analog SCWM [18]. A second source of unwanted harmonics is the digitization of the triangle carrier wave, which, like square wave modulation, can produce significant low-order harmonics (i.e., 1<h<12n). Fortunately, the harmonics can be minimized by optimal selection of n and k, as for example illustrated in FIG. 14(b); where the harmonics below 10 are very small as compared to square wave modulation. Nevertheless, the 7$^{th}$ harmonic is not negligible. Depending on the output voltage THD specification, these low-order harmonics may require filtering along with the sampling frequency harmonics.

Optimizing the selection of n and k for minimum THD requires specifying the harmonics that remain in the pass band of the output filter. An ideal low-pass filter with a cutoff frequency $\omega_c$ is assumed. All harmonics h $\omega/\omega_l$ greater than $\omega_c/\omega_l$ are eliminated by the ideal filter. The remaining harmonics below $\omega_c/\omega_l$ are in the pass band and contribute to the total harmonic distortion of the waveform at the output node of the filter. The program calculates the THD of the phase voltage and the line voltage as a function of n and k. The combination that produces the lowest THD is a candidate for implementation in the inverter. The procedure has been applied to all three line frequencies. Because the line frequency is expected to be electronically selectable, but it is not practical for the power filters to be electronically adaptable, a single stationary filter cutoff frequency is assumed. This forces $\omega_c$ to fall within a limited range safely above the highest line frequency (400 Hz), but usefully below the lowest sampling frequency. The additional requirement to filter troublesome low order harmonics restricts the range of $\omega_c$ to that illustrated in FIG. 14(b). The THD's at the optimal selections for n and k for the three line frequencies are contained in Table I for two different filter cutoff frequencies ($f_c=2\pi/\omega_c=2$ kHz and 4 kHz). Optimization was performed at the higher cutoff frequency and the largest integer value of 12nk consistent with satisfying the condition $\omega_s/\omega_r \leq 0.9$ to allow for blanking time while switching the PLR converter H-bridge.

TABLE I

Results of Optimized Selection of n and k at Three Line Frequencies.
THD$_a$ Applies to the Phase Voltage, THD$_{ab}$ Applies to the Line Voltage
and for All Calculations m$_a$ = 0.95

| $f_1$[Hz] | $f_c$[kHz] | $\omega_c/\omega_l$ | n | k | THD$_a$ [%] | THD$_{ab}$ [%] |
|---|---|---|---|---|---|---|
| 50 | 2 | 40 | 8 | 74 | 1.30 | 1.04 |
| 60 |   | 34 | 6 | 80 | 1.39 | 1.09 |
| 400 |   | 5 | 4 | 18 | 0.23 | 0.19 |
| 50 | 4 | 80 | 8 | 74 | 1.86 | 1.48 |
| 60 |   | 68 | 6 | 80 | 2.01 | 1.65 |
| 400 |   | 10 | 4 | 18 | 2.05 | 1.93 |

Amplitude Scaling

Two additional design variables are the PLR converter transformer turns ratio a=N$_p$/N$_s$ and the amplitude duty factor m$_a$. They should both be selected carefully since the inverter must synchronize $\omega_s$ to the line frequency reference signal to satisfy Equation (13). In theory the lost degree of freedom is made up with m$_a$, which is continuously adjustable over a large linear range (0→1). But in practice disturbing m$_a$ too much from the value at which n and k were optimized invites additional harmonic distortion. Obviously, the transformer turns ratio, once selected, is not adjustable. Fortunately, the output of most likely input voltage sources, such as an automobile alternator, is regulated and can be expected to stay within a few percent of nominal while the engine is running. Only if the engine or alternator fails is a larger deviation likely and then down to the nominal output voltage of the battery. The open-loop voltage regulation of the PLR converter itself is good (a characteristic of this type of converter). To calculate the turns ratio and, incidentally, to determine the minimum blocking voltage of the inverter transistors, a formula for amplitude scaling applicable to SCWM must first be derived.

A formula applicable to conventional analog SCWM is known that relates the RMS line voltage to the dc link voltage. The formula is given in [18, p. 228] as:

$$V_{LL} = m_a \sqrt{\frac{3}{2}} \frac{V_{dc}}{2}. \quad (14)$$

To apply this formula, a second formula equating the average value of the high-frequency AC link voltage to V$_{dc}$ is required. From FIG. 11 the resonant capacitor voltage is approximated as:

$$V_r(t) = V_p \sin\left(\frac{\omega_r}{2}t\right). \quad (15)$$

And the value averaged over one switching period $2\pi/\omega_s$ is given by:

$$\langle V_r(t) \rangle = \frac{\omega_s}{2\pi} \int_0^{2\pi/\omega_r} V_p \sin\left(\frac{\omega_r}{2}t\right) dt. \quad (16)$$

Evaluating (16) leaves:

$$\langle V_r(t) \rangle = \frac{\omega_s}{2\pi} \frac{2}{\omega_r} V_p \left[-\cos\left(\frac{\omega_r}{2}t\right)\right]_0^{2\pi/\omega_r} = \frac{\omega_s}{2\pi} \frac{4}{\omega_r} V_p = \frac{2}{\pi} \frac{\omega_s}{\omega_r} V_p \quad (17)$$

For large values of k both types of link converters (analog SCWM or digitized SCWM) deliver approximately the same volt-seconds over one sampling period (meaning only small differences result from the digitization of the triangular carrier wave); thus justifying equating the resonant capacitor voltage averaged over one switching period to the DC link voltage, $$\langle V_r(t) \rangle = V_{dc}. \quad (18)$$

Equation (14) can now be applied to the discrete SCWM algorithm.

Equation (19) results:

$$V_{LL} = m_a \sqrt{\frac{3}{2}} \frac{V_p}{\pi} \frac{\omega_s}{\omega_r}. \quad (19)$$

Equation (19) is useful because it relates an essential output specification, the line-to-line RMS voltage V$_{LL}$, to the peak AC link voltage V$_p$, which in turn allows the minimum peak blocking voltage of the inverter transistors to be specified and the transformer turns ratio to be calculated.

A point design is now offered that assumes the nominal DC input voltage is 28 V; the nominal AC line voltage is 208 V RMS; and a converter adjustability of +10% is adequate over the load range of the converter. Thus the amplitude duty factor range is 0.85<m$_a$<0.95. Table II provides the results of the solution of (19) for V$_p$ and includes an estimate for the THD at each line frequency. The largest peak voltage in Table II should be used as a guide to selecting semiconductor devices for the inverter bridge and for selecting the transformer turns ratio. The point design assumes that voltage droop resulting from loading of the PLR converter is managed by increasing $m_a$ to the limit of 0.95 at full load, thus ensuring that minimum THD is reached at full load. The turns ratio is selected based on low-load conditions ($m_a$=0.85) and the effective nominal input voltage. In an ideal PLR converter, the peak resonant capacitor voltage is double the dc input voltage; therefore, the effective nominal input voltage is 2×28V=56 V.

$$\frac{N_S}{N_P} = \frac{1}{a} \geq \frac{726\ V}{56\ V} = 13. \quad (20)$$

To derive a neutral, the actual turns ratio should be an even number to allow for a center tap. It should also be greater than the minimum to allow for a non-ideal resonant gain (i.e., less than 2). Candidate values for 1/a include 14, 16, and 18. Losing the alternator or the engine will produce a 16% reduction in input voltage (to approximately 24 V); but this will likely result in no more than a 10% reduction in RMS line voltage under typical load conditions, which is consistent with utility-grade electrical power.

TABLE II

Amplitude Scaling the Inverter Point Design
($m_a$ = 0.85 for All Calculations)

| $f_1$ [Hz] | $\omega_c/\omega_l$ | $THD_a$ [%] | $THD_{ab}$ [%] | $\omega_s/\omega_r$ | $V_p$ [V] |
|---|---|---|---|---|---|
| 400 | 5 | 1.22 | 0.41 | 0.864 | 726 |
| 50 | 40 | 1.19 | 1.01 | 0.880 | 713 |
| 60 | 34 | 1.67 | 1.59 | 0.864 | 726 |

Filter Design

The filter assumed in the calculations contained in Tables I and II is ideal, and thus it is not realizable. A realizable filter that does not overly compromise the point design is desired. Given the relative close proximity of the cutoff frequency to the 400 Hz line frequency, a maximally flat filter profile is desirable; such a profile will prevent additional harmonic distortion caused by pass band ripple. In this case, a Butterworth filter is the choice, although other filter realizations are possible, and these teachings will prompt those schooled in the art to the many possibilities. Considering size and component count, the lowest order filter that satisfies the following requirements is desirable:

1. When $f_l$=400 Hz, minimal pass band attenuation because $\omega_c/\omega_l$ is only 5.
2. When $f_l$=50 or 60 Hz, maximal attenuation at $2\pi/\omega_l T_s$=12k=96 or 72, respectively, because $\omega_c/\omega_l$ is quite close at 40 and 34, respectively.

The first requirement is "common sense." The second requirement is a consequence of the optimized selections for n and k, which cause the sampling frequency to be close to the filter cutoff frequency. The filter cutoff frequency cannot be decreased because of the first requirement. Together, both requirements are best satisfied by the highest filter order practicable. Given the requirements and the size constraints, only a second or fourth order filter is worth considering.

Figure 15:
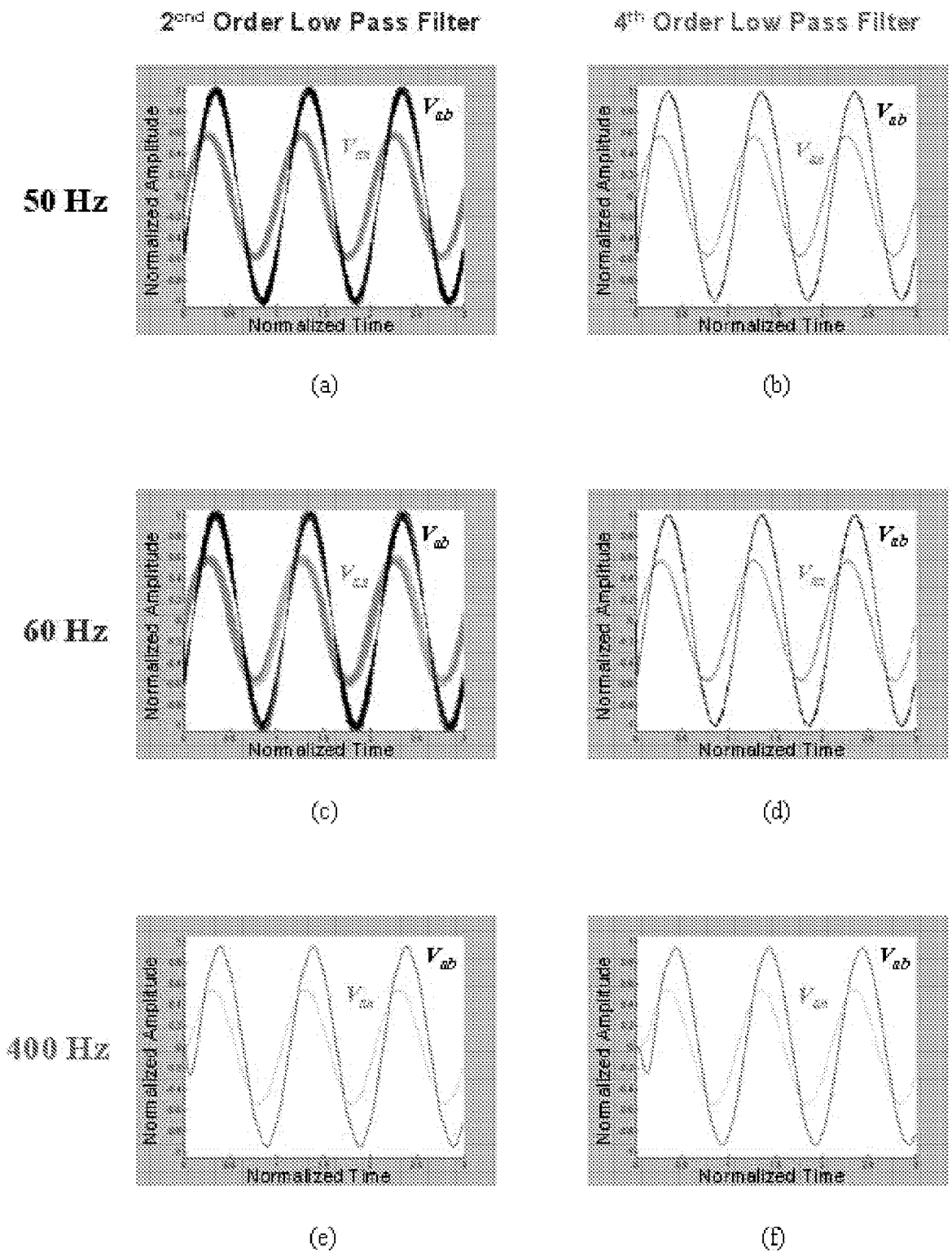
FIGS. 15A-15E show the results of simulated filtering by a second and fourth order Butterworth filter at each of three different line frequencies wherein, for each case, a phase voltage ($V_{an}$) and a line voltage ($V_{ab}$) is illustrated and wherein, in all cases, $f_c$=2 kHz and $m_a$=0.85 and wherein for each line frequency, n and k are the optimal selections listed in Table I.

A MATLAB program has been written that implements both second and fourth order Butterworth filter polynomials to examine the time-domain output of such filters excited by a time series of impulse functions implementing the optimized discrete SCWM algorithm. FIGS. 15(*a*)-15(*f*) illustrate the results of six simulations that predict the waveforms produced at the output of the ADPC using both a second and fourth order filter, each with the same cutoff frequency $f_c$=2kHz. At $f_l$=400 Hz, there is little difference between the two filters. However, at the two lower line frequencies, the influence of the proximity of the sampling frequency to the filter cut off frequency becomes apparent. Clearly, the second-order filter roll-off (−40 dB/dec.) is inadequate to filter the sampling frequency harmonics. In contrast, the fourth-order filter, at least subjectively, produces a waveform clear of significant ripple arising from the sampling frequency harmonics. From this analysis, a fourth-order Butterworth low-pass filter is recommended over a second-order filter.

Figure 16A:
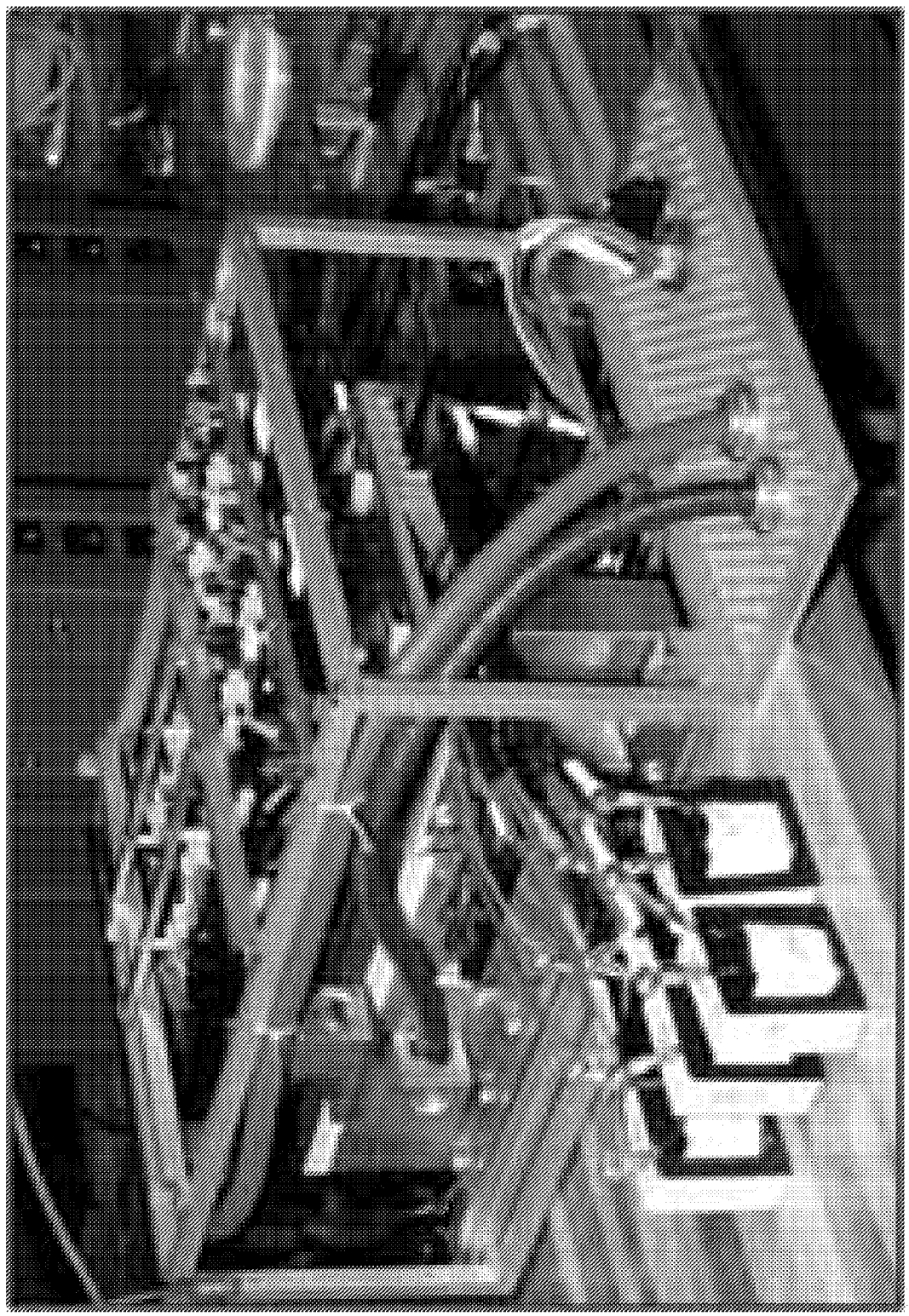
FIG. 16A is a picture of a prototype DC-AC converter according to one embodiment.
Figure 16B:
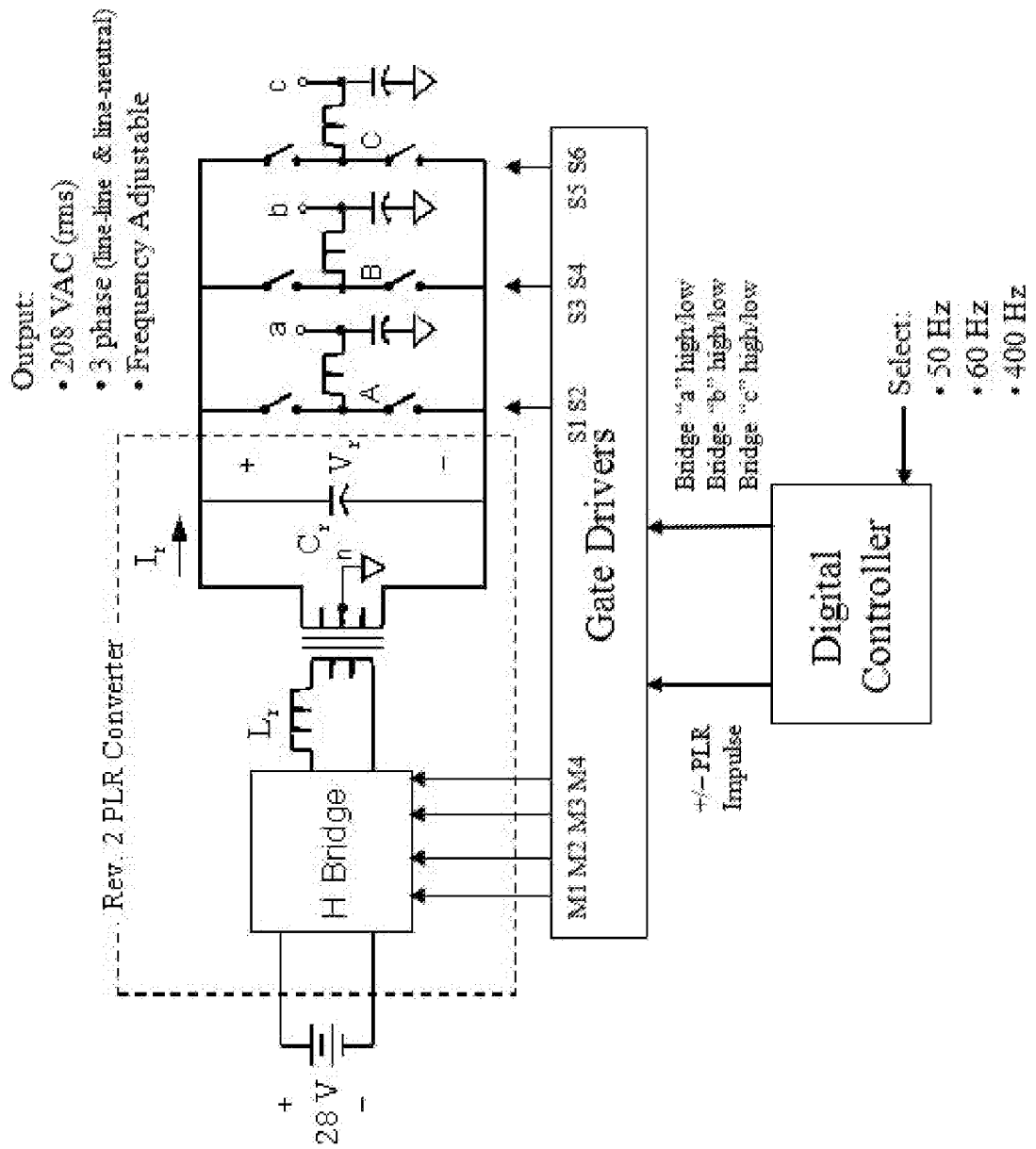
FIG. 16B is a schematic layout of a DC-AC converter according to one embodiment showing gate drivers and a digital controller.

FIG. 16A is a picture of a prototype DC-AC converter according to one embodiment. The converter includes a PLR converter with an H-bridge configuration, a transformer, and three half-bridges connected to the transformer secondary. A digital controller and gate drivers are used to control the output. FIG. 16B is a schematic layout of the DC-AC converter pictured in FIG. 16A.

Figure 17B:
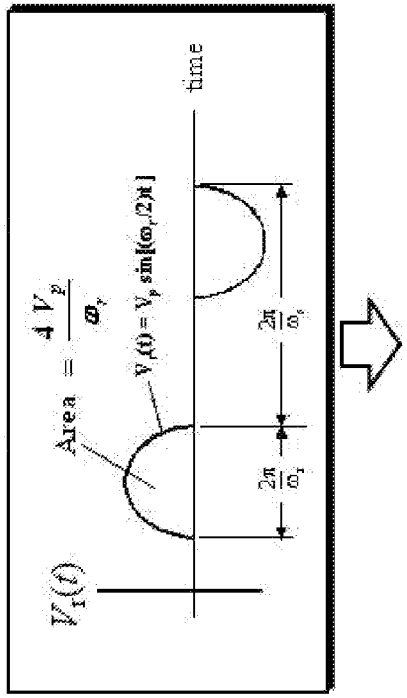
FIG. 17B illustrates a sine function model of resonant capacitor voltage.
Figure 17C:
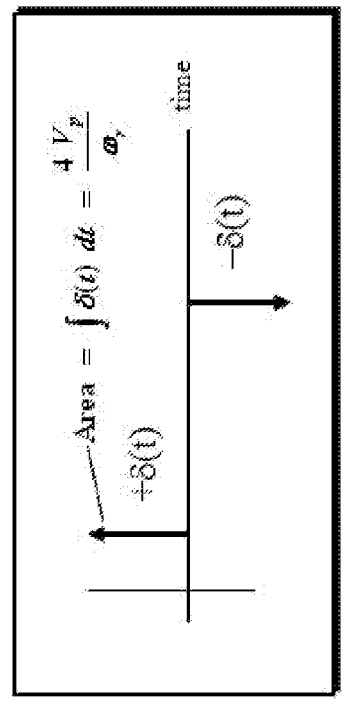
FIG. 17C illustrates an impulse function model of resonant capacitor voltage.
Figure 17A:
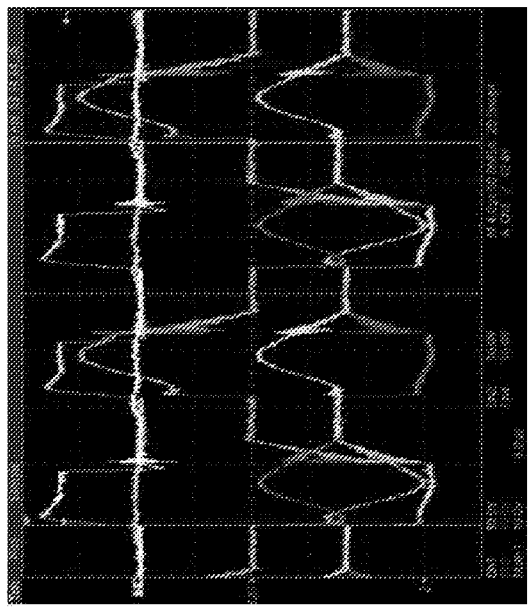
FIG. 17A shows actual PLR converter voltage waveforms.

FIG. 17A shows actual PLR converter voltage waveforms. FIG. 17B illustrates a sine function model of resonant capacitor voltage and FIG. 17C illustrates an impulse function model of resonant capacitor voltage.

Figure 18:
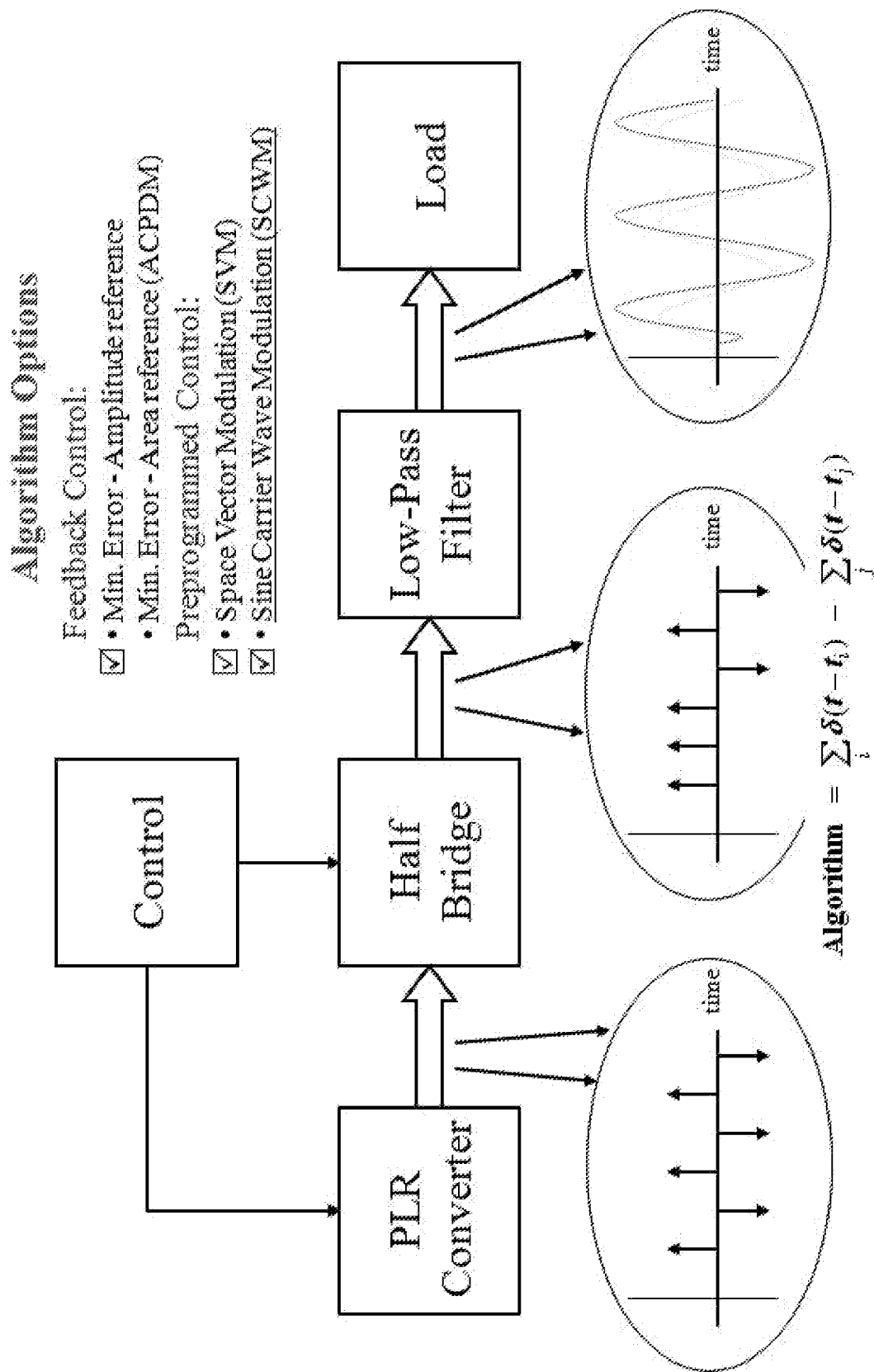
FIG. 18 is a control schematic showing the signal at various stages of the control process and also showing various algorithm options for the controller.

FIG. 18 is a control schematic showing the signal at various stages of the control process. Also shown in FIG. 18 are various algorithm options for the controller. These options include feedback control and preprogrammed control. Modulation strategies for preprogrammed control include Space Vector Modulation (SVM) and Sine Carrier Wave Modulation (SCWM).

In conventional "analog" SCWM, a triangular carrier wave samples a sinusoidal reference at a frequency $1/T_s$, where $T_s$ is the sampling interval. As shown in FIG. 3, the intersection of the carrier and reference voltages determines the resulting pulse width modulation. In discrete Sine Carrier Wave Modulation (DSCWM), the following process is employed:

Select an integer n to divide the line-frequency period by exactly 12 n sampling intervals: $T_s$=(2π/ωline)/(12 n). The effective sampling frequency=12n$\omega_{line}$.

The PLR converter switching frequency $\omega_s$ is locked (this is easily accomplished in the digital controller) so that exactly k impulses occur during one sampling interval: k=$T_s$/(2π/$\omega_s$)

k+1 unit cells are defined that allow the k impulses in each sampling interval to be organized into the k+1 combinations with a unique volt-second product.

The triangular carrier wave is divided into k intervals.

Figure 19C:
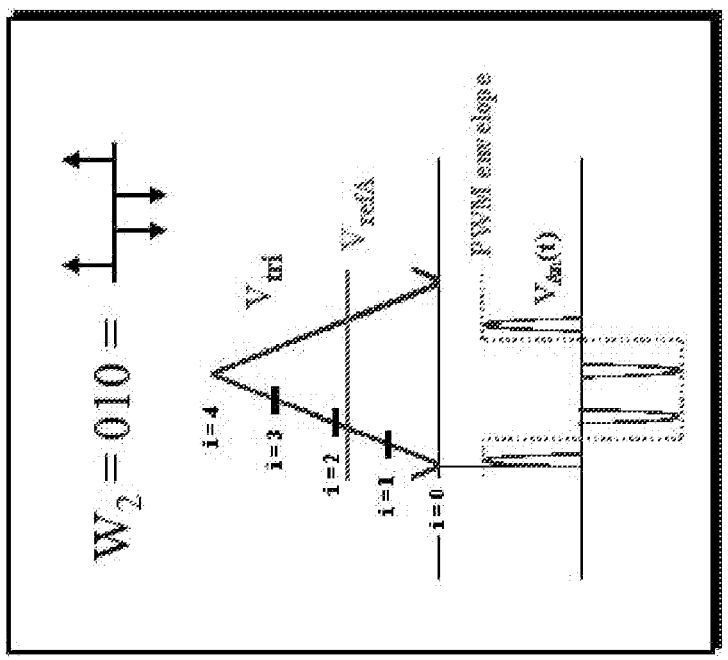
Figure 19B:
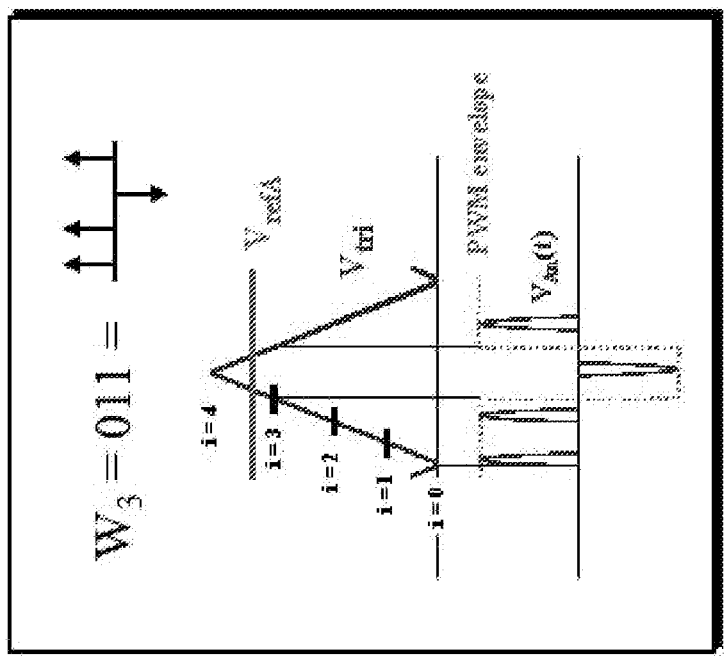
Figure 19A:
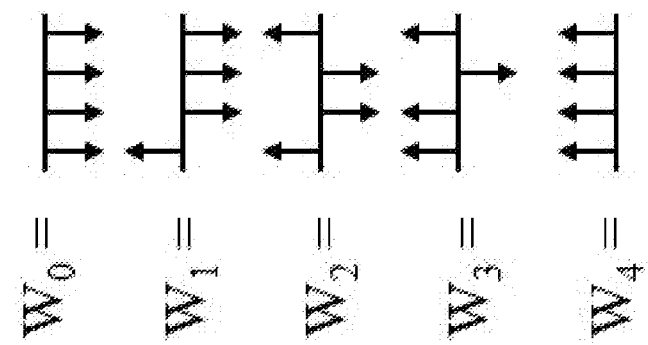

Based on the interval on the triangle intersected by the reference voltage, one of the k+1 unit cells is selected and switched by the half-bridge to the filter. FIGS. 19A-19C illustrates the implementation of a DSWCM algorithm. In this algorithm, five three-bit words ($W_0$-$W_4$), called state vectors, describe all possible unit cells. The state vectors are shown in FIG. 19A. In FIG. 19B, $V_{refA}$, the sinusoidal reference voltage for phase A, intersects the triangular carrier wave in the fourth interval. The state vector corresponding to i=3 is selected (rounding down while above the median at i=2). In FIG. 19B, $V_{refA}$ intersects the second interval. The state vector corresponding to i=2 is selected (rounding up while below the median). State vectors $W_0$ and $W_4$ are reserved for overmodulation ($m_a$>1).

Figure 20:
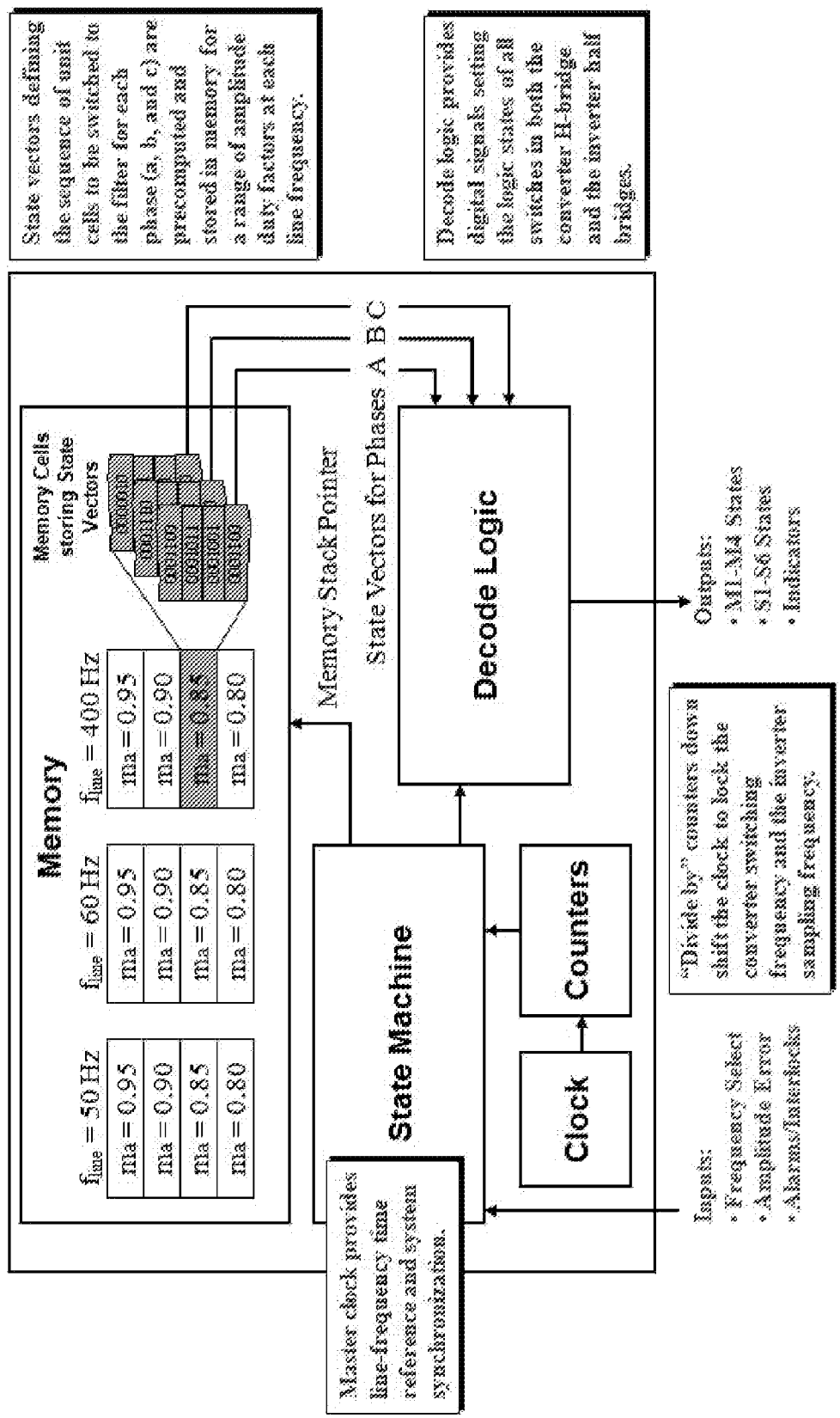
FIG. 20 illustrates the implementation of a digital controller employing a DSWCM algorithm.

FIG. 20 illustrates the implementation of a digital controller. State vectors defining the sequence of unit cells to be switched to the filter for each phase (A, B and C) are precomputed and stored in memory for a range of amplitude duty factors at each line frequency. Decode logic provides digital signals setting the logic states of all switches in both the converter H-bridge and the inverter half bridges. A master clock provides line frequency time reference and system synchronization. "Divide by" counters down shift the clock frequency to lock the converter switching frequency and the inverter sampling frequency.

In designing the filter, various constraints are present. The constraints can be broadly classified as either physical constraints or spectral constraints.

Physical Constraints are set forth below:
The filter order should be as low as possible to reduce the part count.
The filter cutoff frequency should be as large as possible to reduce the size of the parts.

Spectral Constraints are set forth below:
The cutoff frequency should be below the sampling frequency to eliminate switching harmonics.
The cutoff frequency should be above the largest line frequency.
The pass band should be reasonably flat to avoid amplifying low-order harmonics in the pass band.
Roll off should be monotonic so that there is adequate attenuation of switching harmonics in the stop band.
A filter design addressing these constraints has been implemented by:
Optimizing selection of n and k at each line frequency to minimize low-order harmonics.
Select the cutoff frequency=2 kHz to minimize Total Harmonic Distortion (THD) @ $f_{line}$=400 Hz due to 7th harmonic.
Selecting a 4th order Butterworth low-pass filter to adequately attenuate sampling frequency harmonics beginning at 4.8 kHz and 4.3 kHz for 50 and 60 Hz line frequencies, respectively, and to avoid pass- and stop-band ripple.

Figures 21A, 21B, 21C:
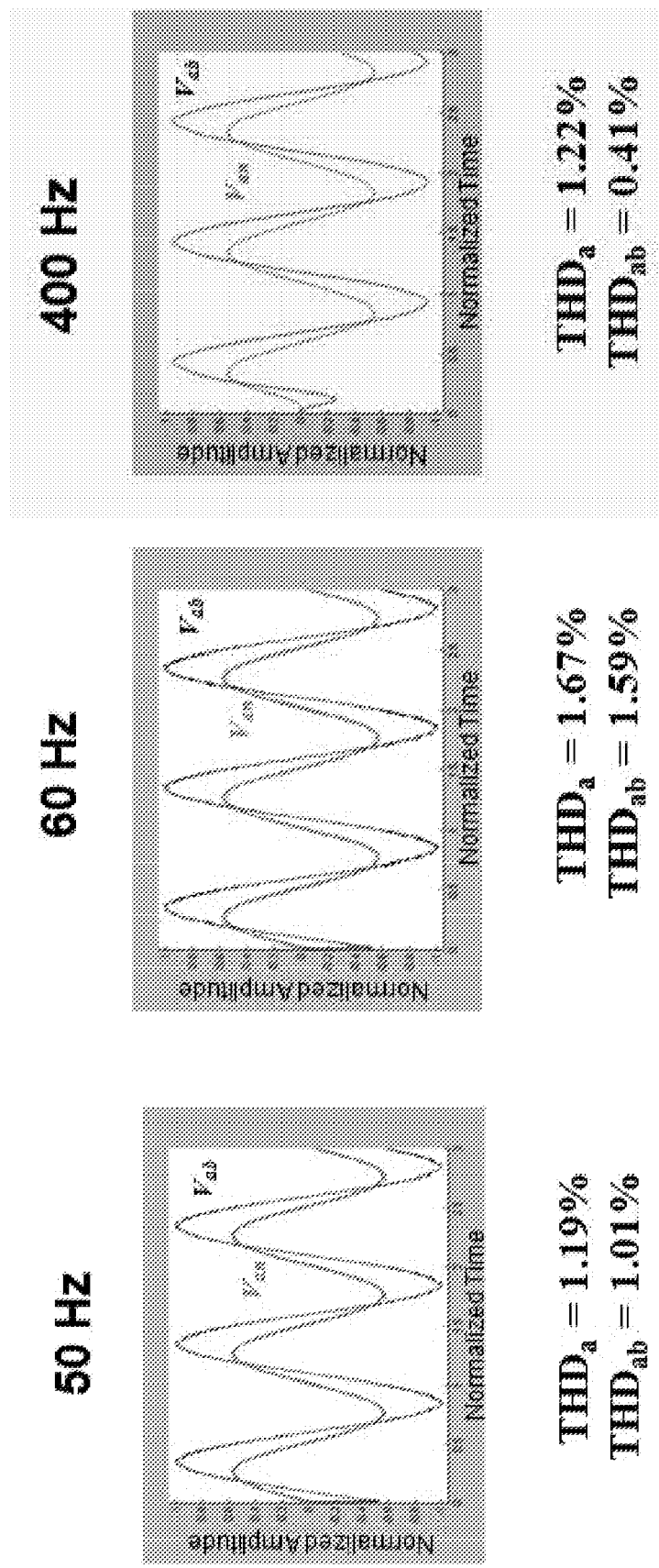
FIGS. 21A-21C show the calculated line-line and line-neutral output voltage waveforms for a Butterworth $4^{th}$ order low pass filter with a 2 kHz cutoff frequency at 50 Hz (FIG. 21A), 60 Hz (FIG. 21B), and 400 Hz (FIG. 21C).

FIGS. 21A-21C show the calculated line-line and line-neutral output voltage waveforms for a Butterworth $4^{th}$ order low pass filter with a 2-kHz cutoff frequency. THD was calculated assuming optimal n and k at each line frequency and $m_a$=0.85.

Key factors influencing the specifications are:
Switching frequency to resonant frequency ratio, $\omega_s/\omega_r$<90% to provide blanking time for switching.
Amplitude duty factor at nominal (50%) load, $(m_a)_{nom}$=0.85 to provide acceptable THD, and ±5% margin for losses between light load and rated load.
DC input voltage: $(V_{in})_{nom}$=28 V, $(V_{in})_{min}$=24 V to enable short-duration UPS function off of truck batteries.
Nominal line-line output voltage=208 Vrms±10% which is equivalent to utility service.
Rated output power=5.6 kW, short duration overload=7 kW. Rated line current at 90% nominal output voltage=17 Arms.

Key specifications are:
Transformer turns ratio: $14 \leq N_s/N_p \leq 18$.
Half-bridge switch voltage, $BV_{DS} \geq 800$ V.
Half-bridge switch current, $ID_{SS} \geq 30$ A.

Figure 22:
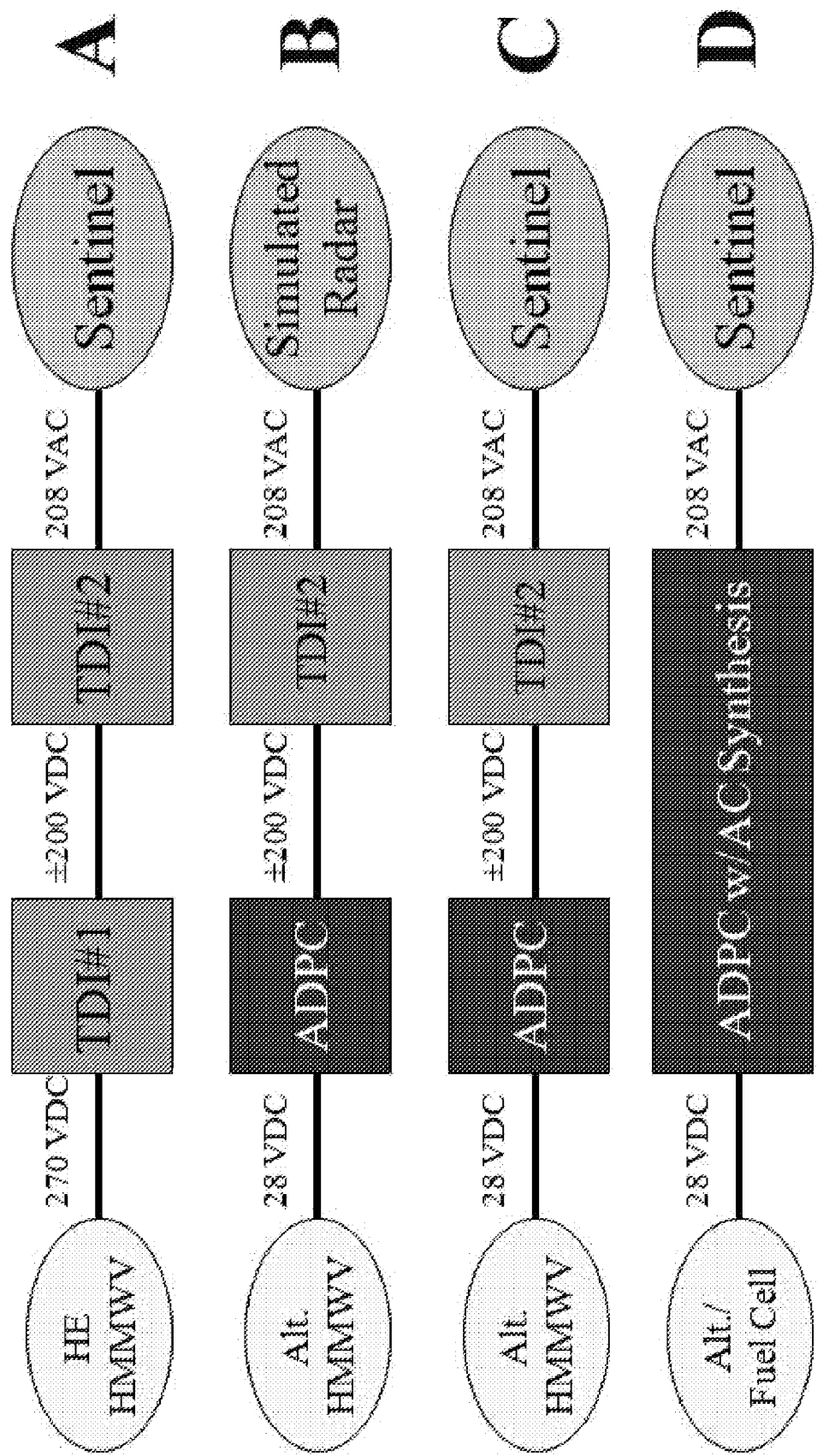
FIGS. 22A-22D are schematics illustrating options for generating 208 V AC from various DC power sources.

FIGS. 22A-22D illustrate various options for generating 208 V AC current from DC sources of 270 V (FIG. 22A), 28 V (FIGS. 22B and 22C) and 48V (FIG. 22D).

FIGS. 23A and 23B are schematics illustrating two alternative system embodiments. FIG. 23A shows a PLR converter in a DC-DC converter system comprising a rectifier bridge in which 24 V DC is converted to either 200 or 300-400 V AC. FIG. 23B shows a PLR converter in a DC-AC inverter system comprising active switches in place of the rectifier and a DSP controller which can be used to synthesize any line frequency waveform desired. In FIG. 23B, a 28 V DC input source is shown being converted to 208 V AC, 3-phase power at a frequency of 50, 60 or 400 Hz.

Figure 24:
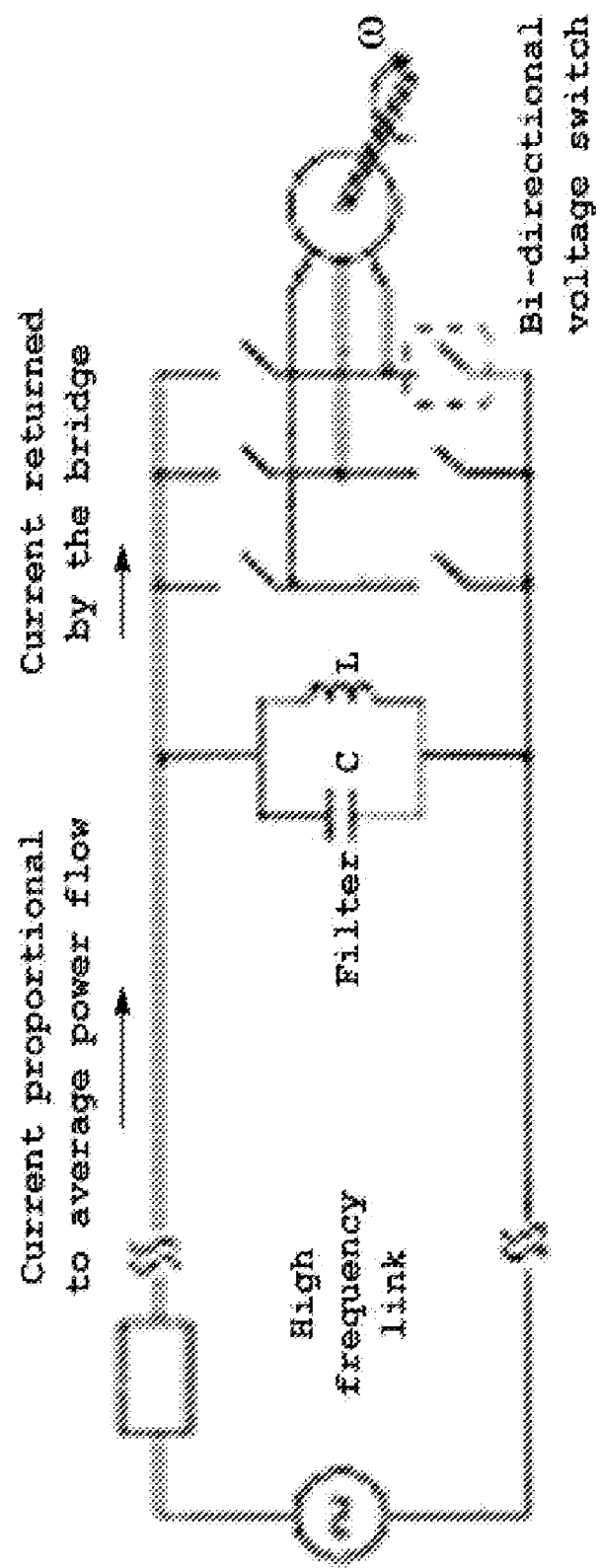
FIG. 24 is a schematic layout of a bridge converter with an AC link according to Reference [8].

FIG. 24 is a schematic layout of a bridge converter with an AC link according to Reference [8].

Figure 25B:
FIGS. 25A and 25B show current and voltage, respectively, for a PLR converter.
Figure 25A:

FIGS. 25A and 25B show current and voltage, respectively, for a PLR converter. Secondary, $C_{resonant}$ and output current are shown in FIG. 25A. $V_1$, $V_2$ and $V_1$-$V_2$ are shown in FIG. 25B. The output voltage was 402.3 V, the output current was 6.36 A and the output power was 2560 W. η=75%.

Figure 26:
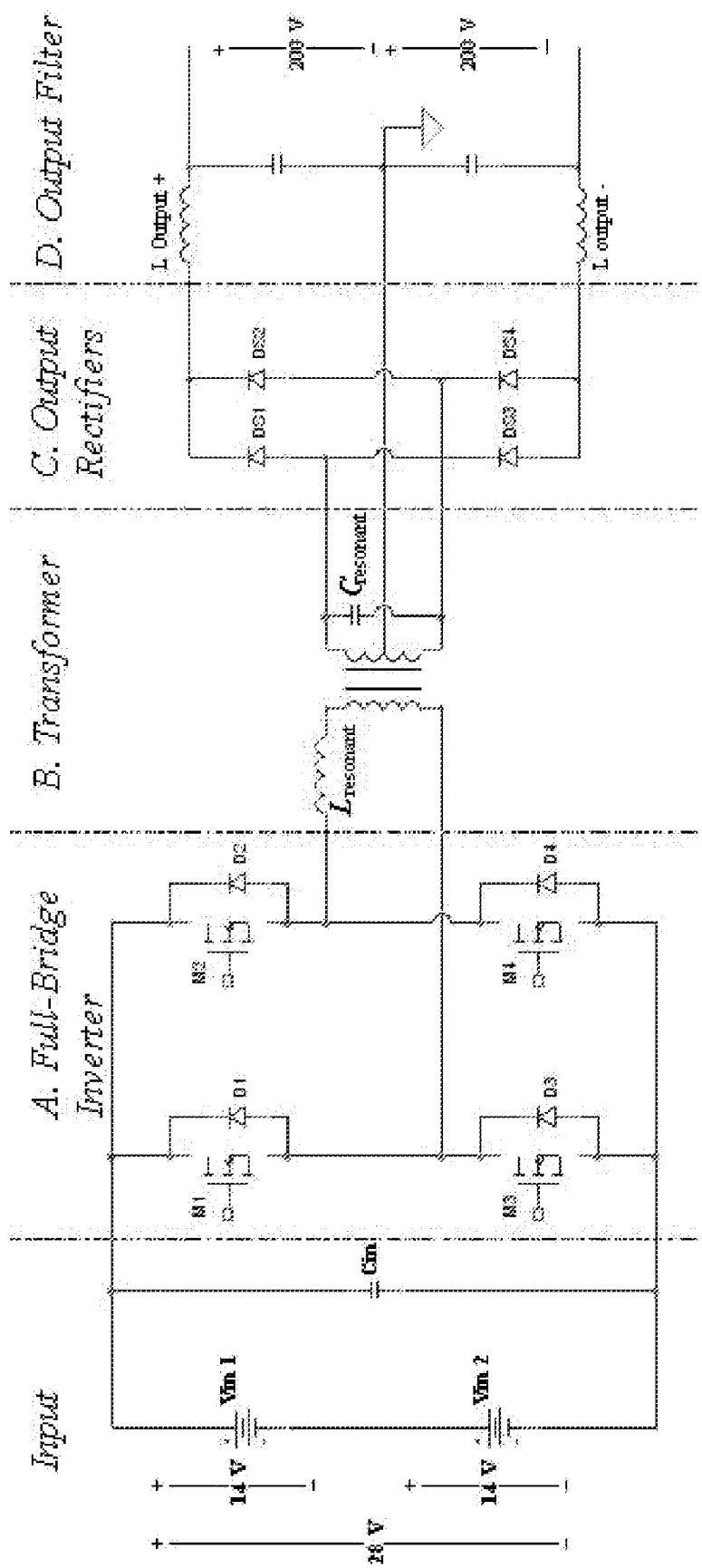
FIG. 26 is a schematic of a PLR converter including a full bridge inverter, a transformer, secondary rectifiers and secondary output filters.

FIG. 26 is a schematic of a PLR converter. As shown, the converter includes a 28 V DC input, a full bridge inverter, a transformer, secondary rectifiers and secondary output filters. In an alternative embodiment, rectifiers 1-4 can be replaced with bi-directional switches.

While the foregoing specification teaches the principles of the present invention, with examples provided for the purpose of illustration, it will be appreciated by one skilled in the art from reading this disclosure that various changes in form and detail can be made without departing from the true scope of the invention.

REFERENCES

[1] A. Isurin, and A. Cook, "A Novel Resonant Converter Topology and its Application," *Power Electronics Specialists Conference*, vol. 2, pp. 1039-1044, 2001.

[2] Ned Mohan, Tore M. Undeland, and William P. Robbins, "Chapter 8 Switch-mode dc-ac inverters: dc to sinusoidal ac," Power Electronics, Converters, Applications, and Design, 2nd Ed. Wiley, New York, pp. 200-243, 1995.

[3] Ned Mohan, Tore M. Undeland, and William P. Robbins, "Chapter 9 Resonant converters; Section 9-7 Resonant-dc-link inverters with zero-voltage switchings," Power Electronics, Converters, Applications, and Design, 2nd Ed. Wiley, New York, pp. 287-289, 1995.

[4] Katsuhisa Inagaki and Shigeru Okuma, "High Frequency Link DC/AC Converters Using Three Phase Output PWM Cycloconverters for Uninterruptible Power Supplies," *Proc. IEEE INTELEC'91*, pp. 580-586, November 1991.

[5] P. T. Krein, Xix Geong, and R. Balog, "High-Frequency Link Inverter Based on Multiple-Carrier PWM," *Proc. IEEE Applied Power Electronics Conf.* 2002, pp. 997-1003, 2002. See also U.S. Pat. No. 6,700,803.

[6] P. T. Krein and R. Balog, "Low Cost Inverter Suitable for Medium-Power Fuel Cell Sources, *Proc. IEEE Power Electronics Specialist Conf.*, pp. 321-326, 2002.

[7] Pradeep K. Sood and Thomas A. Lipo, "Power Conversion Distribution System Using a High-Frequency AC Link," *IEEE Trans. Industry Applications*, vol. 24, pp. 288-300, March/April 1988.

[8] Pradeep K. Sood, Thomas A. Lipo, and Irving G. Hansen, "A Versatile Power Converter for High-Frequency Link Systems," *IEEE Trans. Power Electronics*, vol. 3, pp. 383-390, October 1988.

[9] Seung K. Sul and Thomas A. Lipo, "Design and Performance of a High-Frequency Link Induction Motor Drive Operating at Unity Power Factor," *IEEE Trans. Industry Applications*, vol. 26, pp. 434-440, May/June 1990.

[10] N. Mohan, T. M. Undeland, and W. P. Robbins, *Power Electronics Converters, Applications, and Design*, New York: Wiley, 1995.

[11] R. Steigerwald, "Power Electronic Converter Technology," *Proceedings of the IEEE*, vol. 89, pp. 890-897, 2001.

[12] C. Viejo, M. Garcia, M. Secades, J. Antolin, "A Resonant High Voltage Converter with C-Type Output Filter," *Conference Record of the IEEE Industry Applications Conference, vol. 3, pp. 2401-2407, 1995.
[13] A. Bhat, "A Unified Approach for the Steady-State Analysis of Resonant Converters," *IEEE Transactions on Industrial Electronics*, vol. 38, pp. 251-259, August 1991.
[14] R. Steigerwald, "A Comparison of Half-Bridge Resonant Converter Topologies," *IEEE Transactions on Power Electronics*, vol. 3, pp. 174-182, 1988.
[15] R. Steigerwald, "High Frequency Resonant Transistor DC-DC Converters," *IEEE Transactions on Industrial Electronics*, vol. IE-31, pp. 1881-190, May 1984.
[16] Ojo, V. Madhani, "Time-averaging Equivalent Circuit Analysis and Controller Design of Full-Bridge Parallel Resonant DC/DC Converters," *Conference Record of the IEEE Industry Applications Society Annual Meeting*, vol. 1, pp. 977-989, 1991.
[17] Y. Kang and A. Upadhyay, "Analysis and Design of a Half-Bridge Parallel Resonant Converter," *IEEE Transactions on Power Electronics*, vol. 3, pp. 254-265, July 1988.
[18] Ned Mohan, Tore Undeland, and William Robbins, Power Electronics Converters, Applications, and Design, 2nd Ed., John Wiley, New York, 1995, pp. 225-239.
[19] Y-F. Lam, Analog and Digital Filters

What is claimed is:

1. A circuit comprising:
a primary section comprising input terminals adapted to receive a DC input;
a secondary section comprising a parallel capacitance resonance section and an inverting section comprising bi-directional switches; and
a transformer coupling the primary and secondary sections, the transformer having a primary side and a secondary side;
wherein the primary section comprises a plurality of transistors in an H-bridge configuration comprising a first group of transistors on a first side of the bridge and a second group of transistors on a second side of the bridge opposite the first side of the bridge;
wherein the DC input is applied to the drain terminals of the first group of transistors;
wherein the source terminals of the first group of transistors, the drain terminals of the second group of transistors and the primary side of the transformer are connected;
wherein the source terminals of the second group of transistors are connected to form a return path for the current; and
wherein the parallel capacitance resonance section is connected across the secondary side and is in resonance with a resonant inductance including a leakage inductance of the transformer and wherein a voltage across the parallel capacitance resonance section is discontinuous haversine waveform with alternating polarity.

2. The circuit of claim 1, wherein the secondary section further comprises a filter section.

3. The circuit of claim 1, wherein the plurality of transistors are metal-oxide semi-conductor field-effect transistors (MOSFETs).

4. The circuit of claim 3, wherein the drain terminals of the first group of MOSFETs are connected to one or more input bus bars.

5. The circuit of claim 3, wherein the drain terminals of a first portion of MOSFETs in the first group are connected to a first input bus bar and the drain terminals of a second portion of MOSFETs in the first group are connected to a second input bus bar.

6. The circuit of claim 3, wherein the source terminals of the first group of MOSFETs, the drain terminals of the second group of MOSFETs and the primary side of the transformer are connected to one or more transformer link bus bars.

7. The circuit of claim 3, wherein the source terminals of a first portion of MOSFETs in the first group and the drain terminals of a first portion of MOSFETs in the second group are connected to a first transformer link bus bar and the source terminals of a second portion of MOSFETs in the first group and the drain terminals of a second portion of MOSFETs in the second group are connected to a second transformer link bus bar and wherein the primary side of the transformer is connected to the first and second transformer link bus bars.

8. The circuit of claim 3, further comprising:
a heat sink, wherein the source terminals of the MOSFETs on the second side of the bridge are connected to the heat sink and wherein the heat sink provides a return path for the current.

9. The circuit of claim 8, wherein the MOSFETs have an isolated base and are mounted on the heat sink.

10. The circuit of claim 1, wherein the inverting section is connected to the secondary side of the transformer.

11. The circuit of claim 10, wherein the inverting section comprises a half-bridge inverter.

12. The circuit of claim 10, wherein the inverting section comprises a single-phase or poly-phase bridge.

13. The circuit of claim 1, wherein the bi-directional switches are MOSFETs or power insulated gate bipolar transistors (IGBTs).

14. The circuit of claim 10, further comprising a filter, wherein output from the inverting section is fed into the filter.

15. The circuit of claim 14, wherein the filter is a two-pole L-C filter.

16. The circuit of claim 14, wherein the filter is a four-pole L-C filter.

17. The circuit of claim 6, wherein the MOSFETs are mounted on the one or more transformer link bus bars.

18. A converter comprising:
the circuit of claim 1; and
a central controller which is adapted to control the bi-directional switches in the inverting section of the circuit.

19. The converter of claim 18, wherein the controller is adapted to control the bi-directional switches using a discretized carrier wave modulation algorithm.

20. The converter of claim 18, wherein the inverting section comprises a single phase and poly phase bridge.

* * * * *